US005907578A

United States Patent [19]

Pon et al.

[11] Patent Number: 5,907,578
[45] Date of Patent: May 25, 1999

[54] WEIGHTED CARRIER PHASE MULTIPATH REDUCTION

[75] Inventors: Rayman W. Pon, Cupertino; Dominic G. Farmer, Milpitas, both of Calif.

[73] Assignee: Trimble Navigation, Sunnyvale, Calif.

[21] Appl. No.: 08/650,817

[22] Filed: May 20, 1996

[51] Int. Cl.$^6$ ........................................... H04B 15/00
[52] U.S. Cl. ...................... 375/208; 375/209; 342/352; 342/356; 342/357
[58] Field of Search ........................... 342/452, 457, 342/463; 370/208, 335; 375/200, 206, 208, 326; 455/67.1, 59, 68, 70, 501, 506

[56] References Cited

U.S. PATENT DOCUMENTS

| 5,101,416 | 3/1992 | Fenton et al. . |
|---|---|---|
| 5,146,471 | 9/1992 | Cowart ................................... 375/200 |
| 5,347,536 | 9/1994 | Meehan ................................... 375/326 |
| 5,583,517 | 12/1996 | Yokev et al. ............................. 342/457 |
| 5,654,989 | 8/1997 | Gurney et al. ........................... 375/326 |
| 5,752,167 | 5/1998 | Kitayoshi ................................. 455/67.1 |

*Primary Examiner*—Stephen Chin
*Assistant Examiner*—Joseph Roundtree
*Attorney, Agent, or Firm*—Boris G. Tankhilevich

[57] ABSTRACT

The effect of the multipath distortions on the carrier phase measurements is reduced by using the weighted correlation functions. The generators of both periodic and dynamic weighted functions are used. The apparatus and method employing generators of such weighted functions can comprise the standard correlators and/or the weighted function correlators.

25 Claims, 20 Drawing Sheets

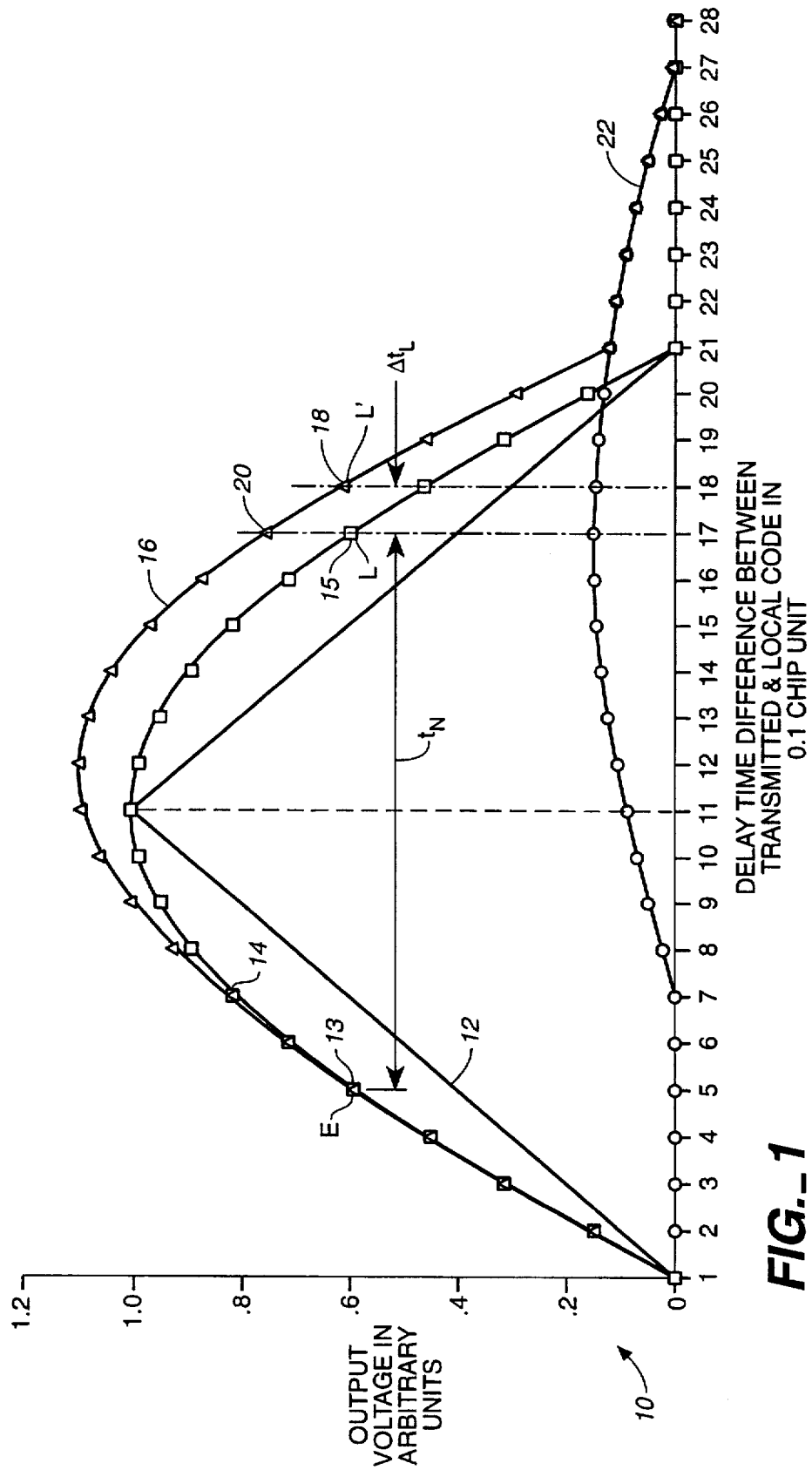
FIG._1

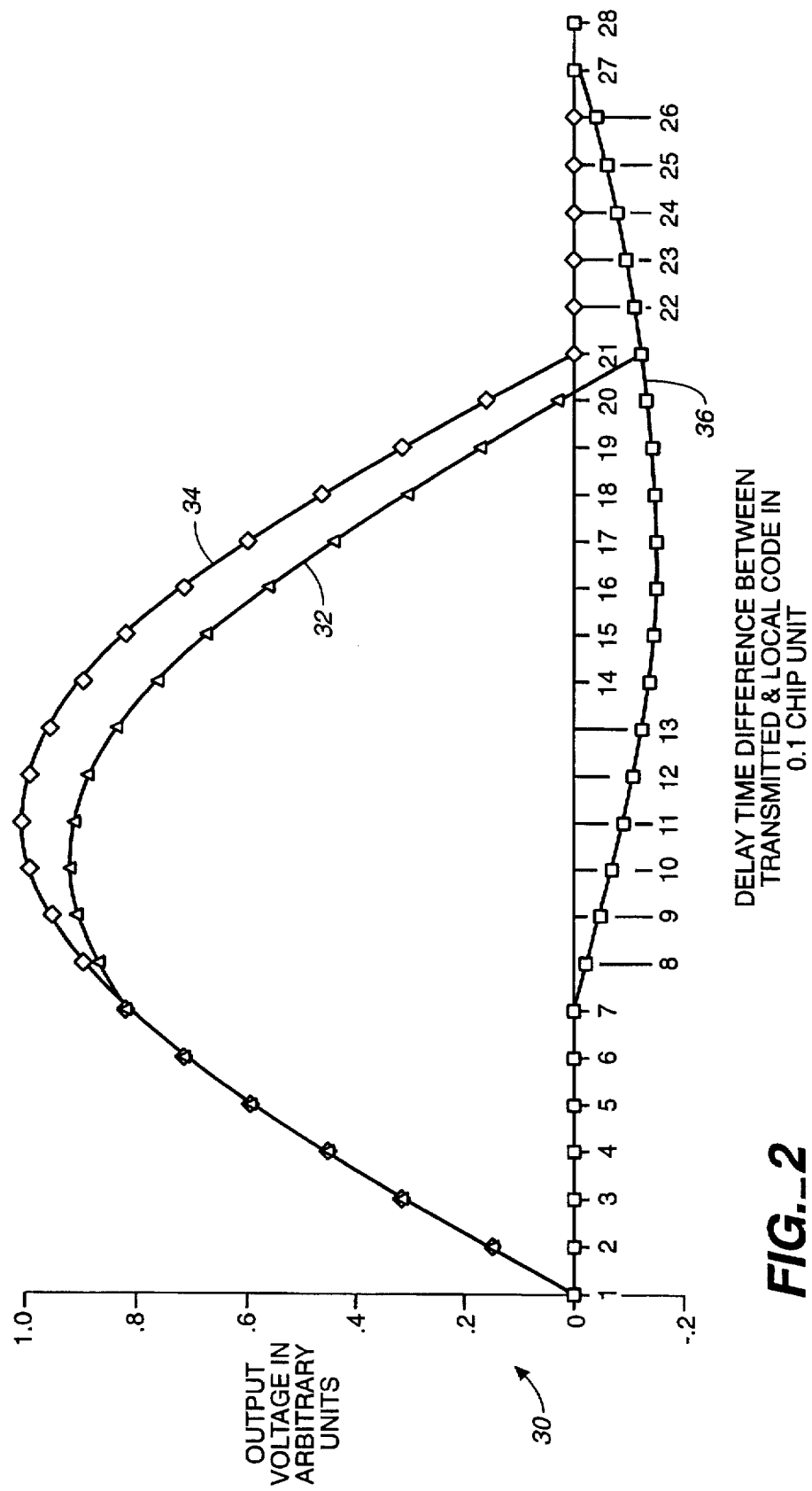
FIG._2

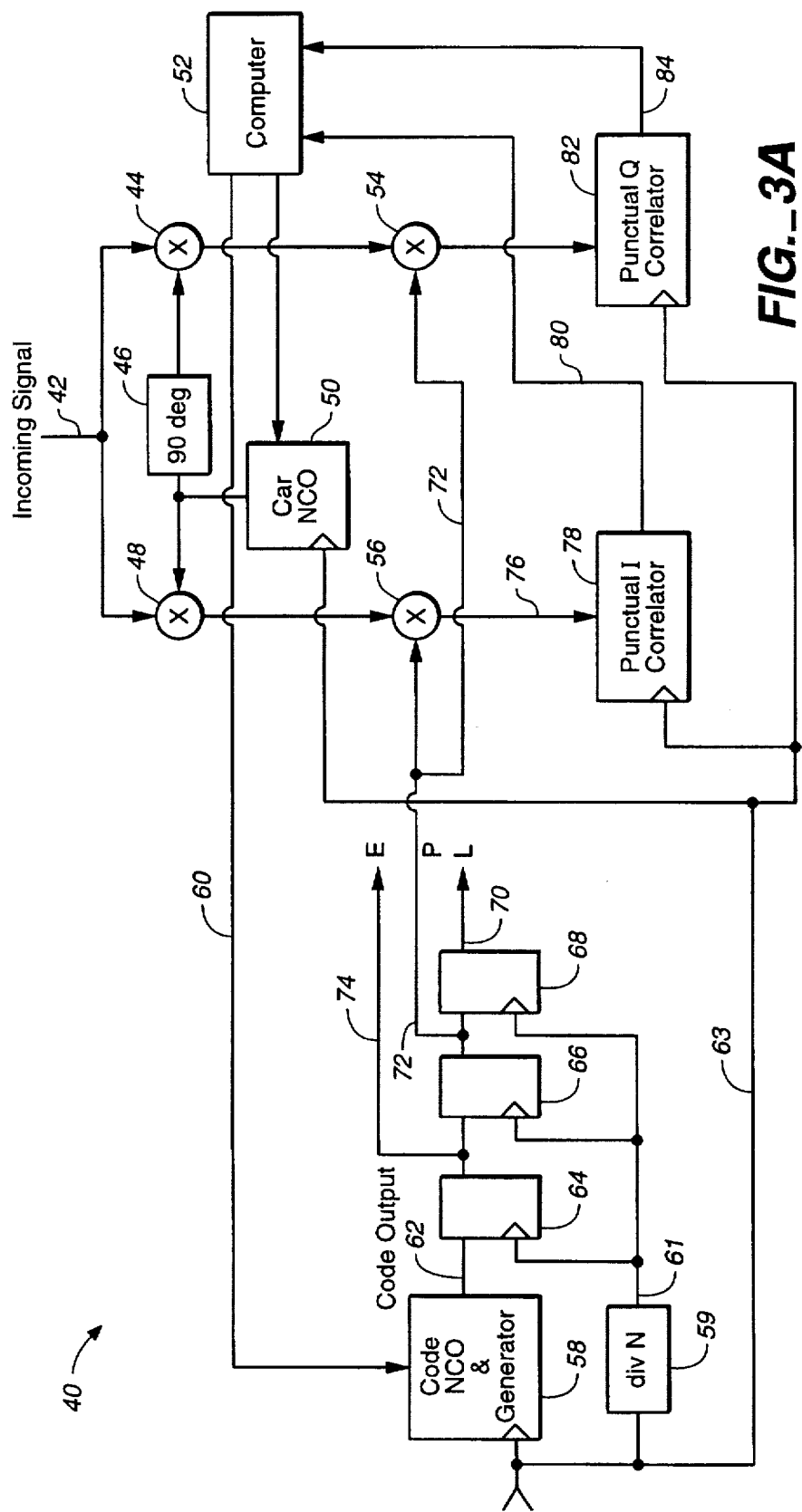
FIG._3A

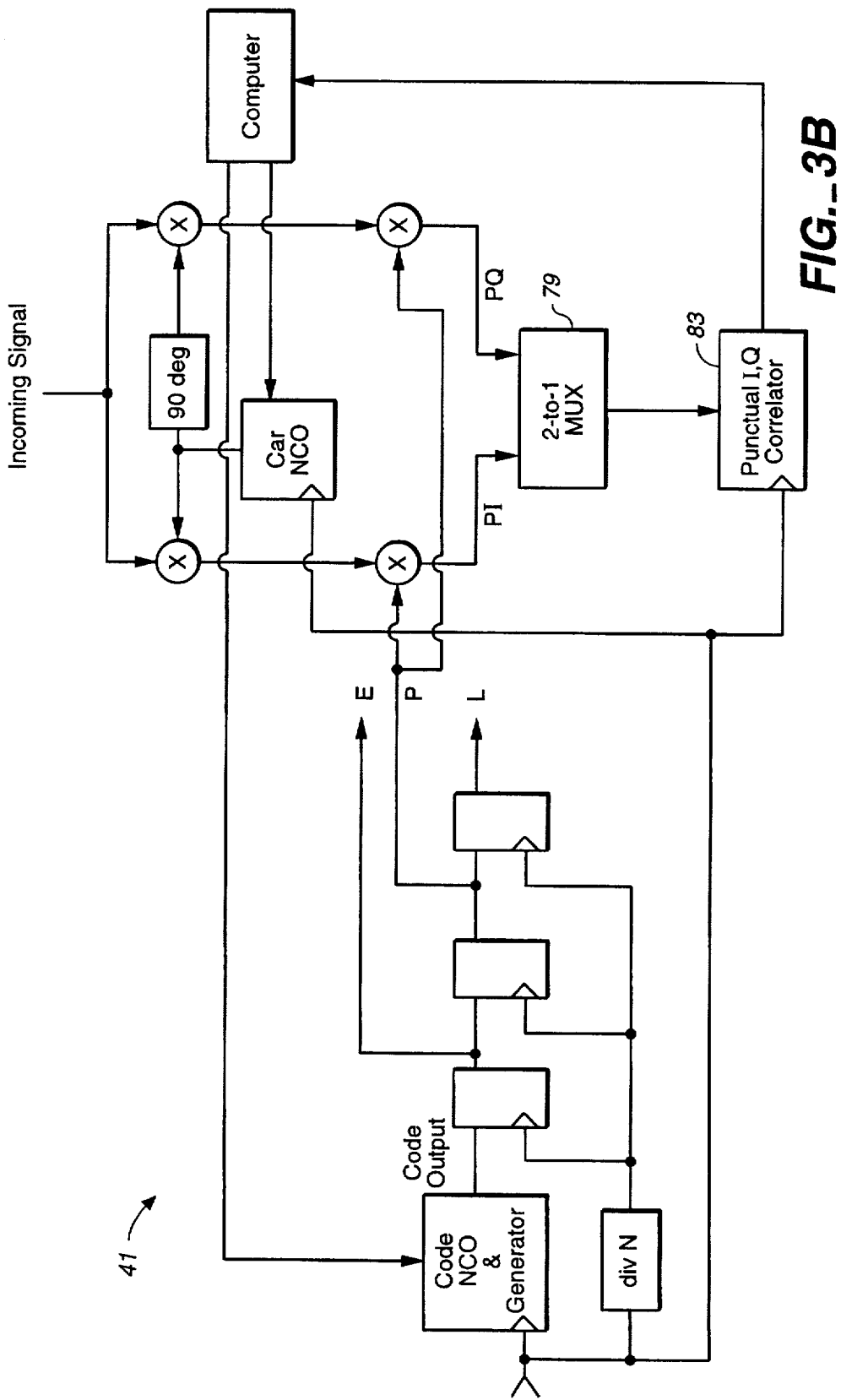
FIG._3B

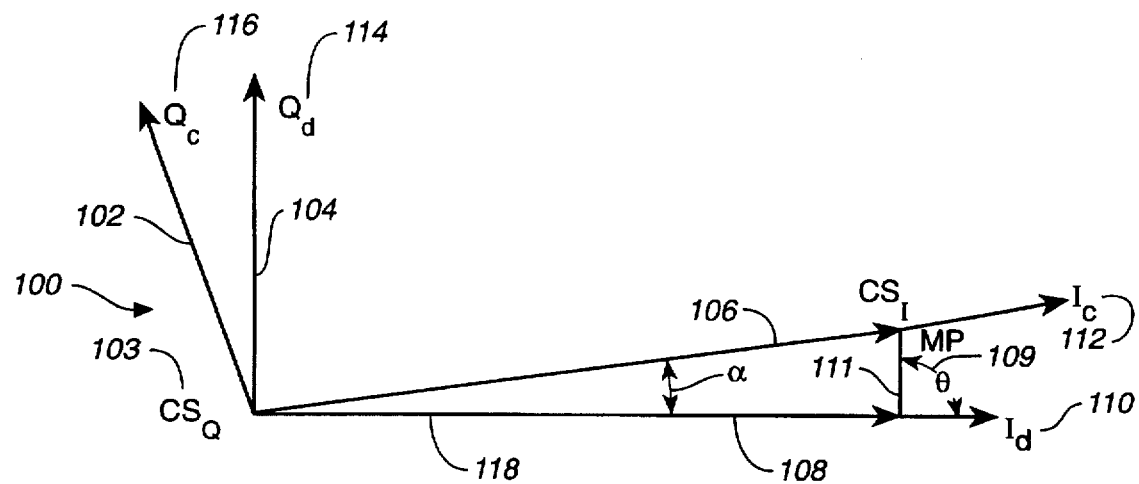
FIG._4A
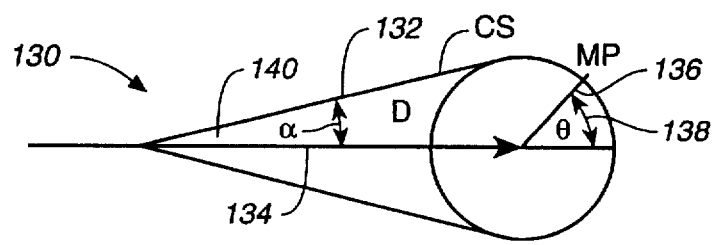
FIG._4B
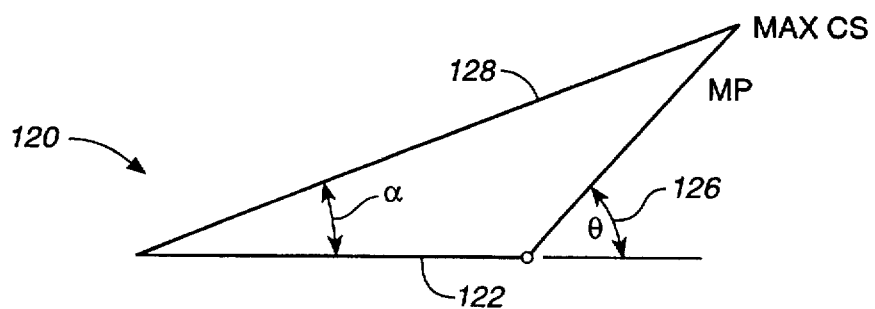
FIG._4C

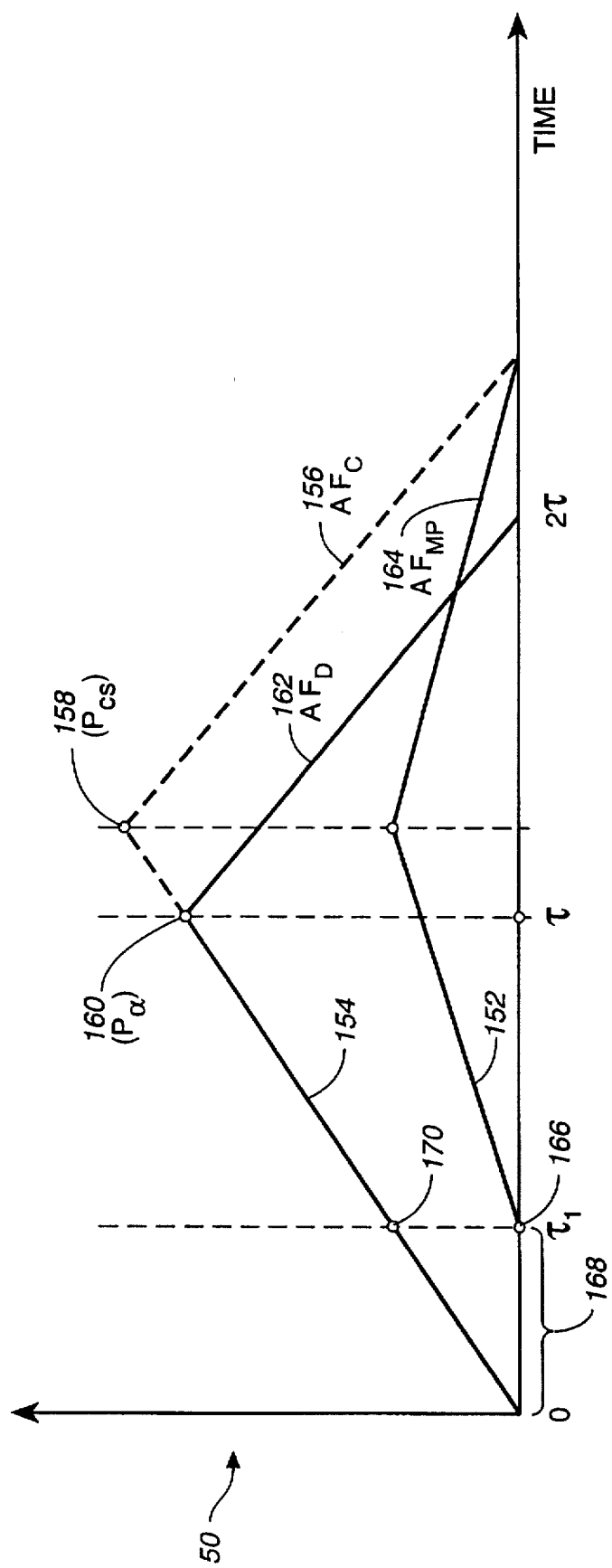
FIG._5

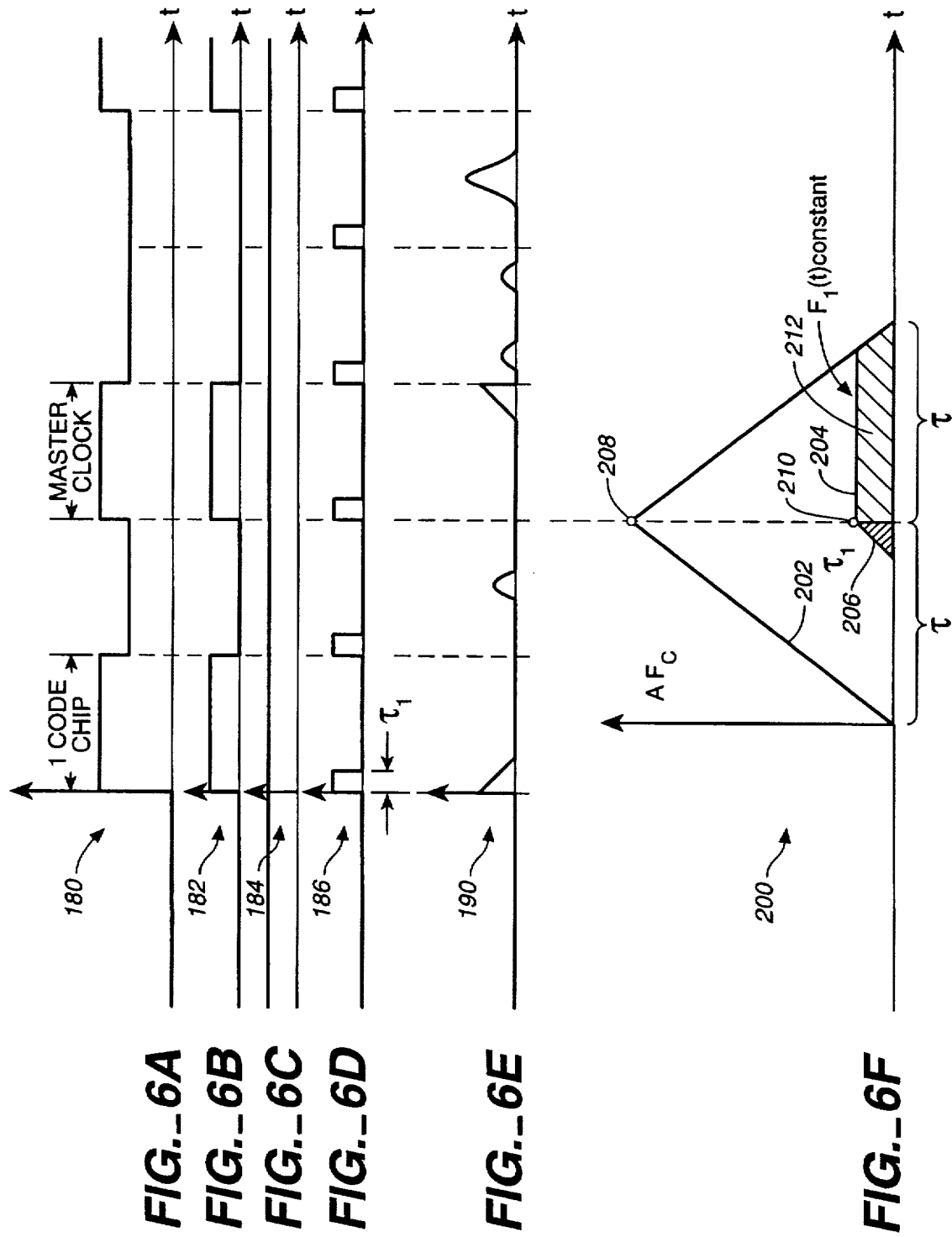

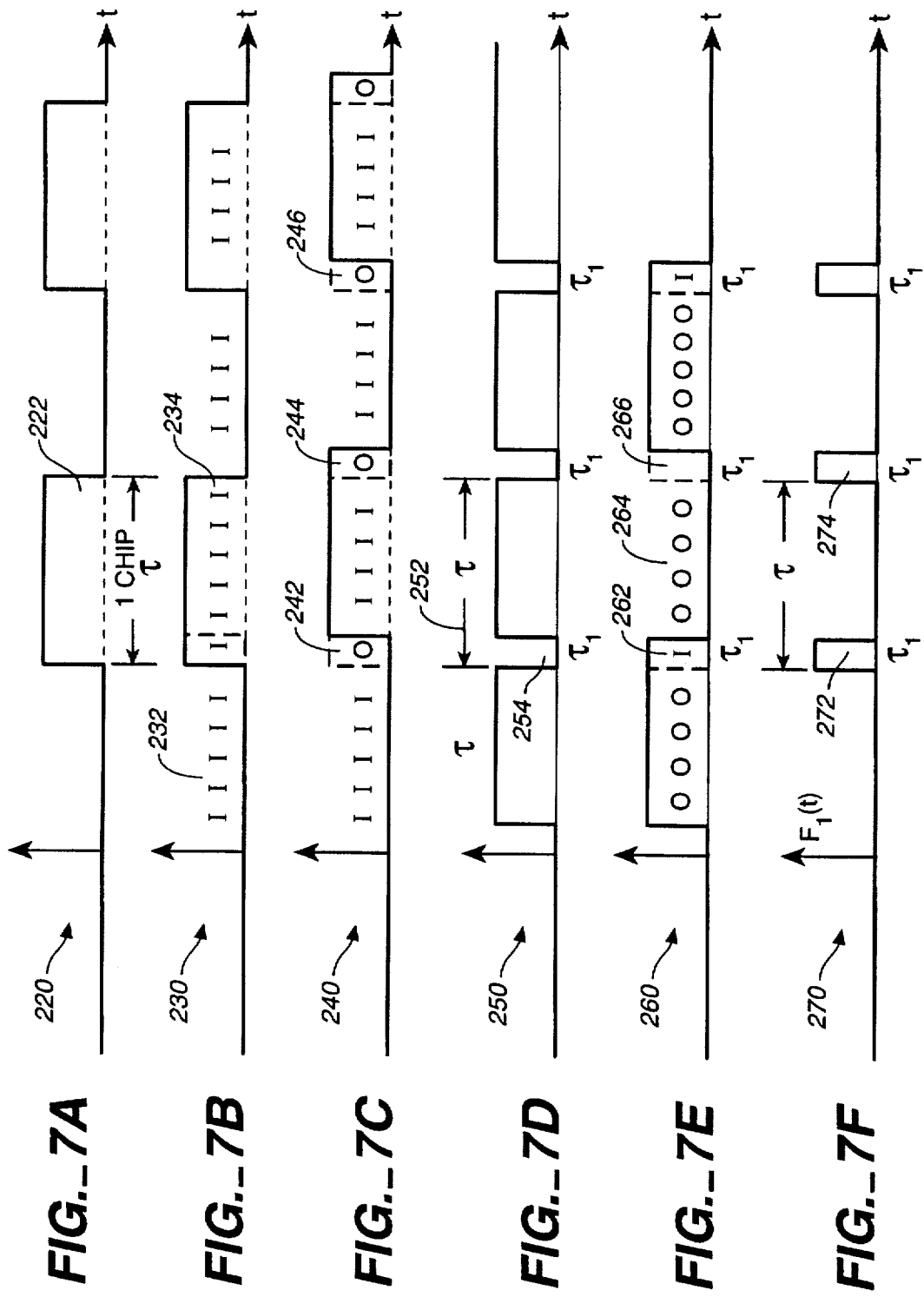

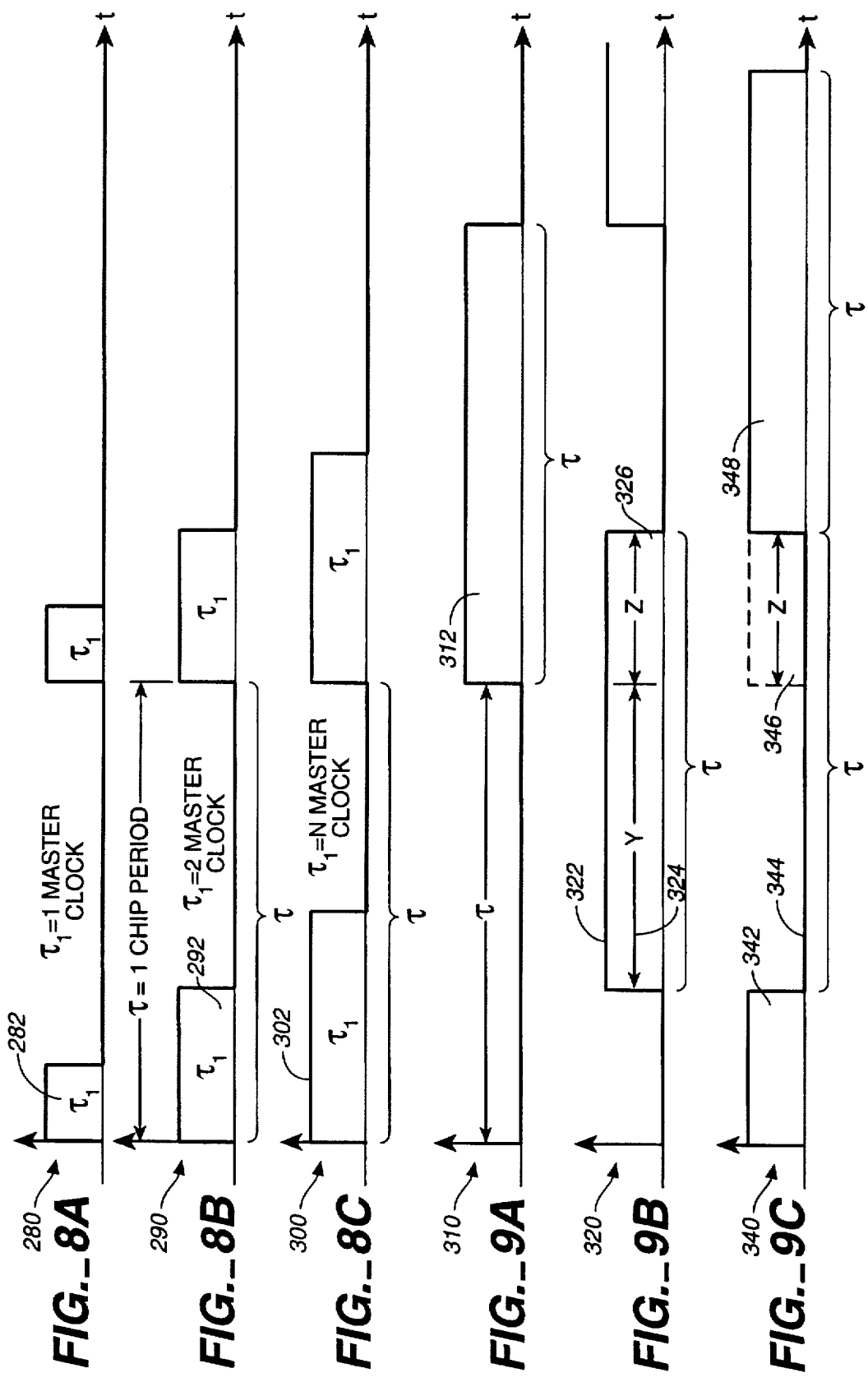

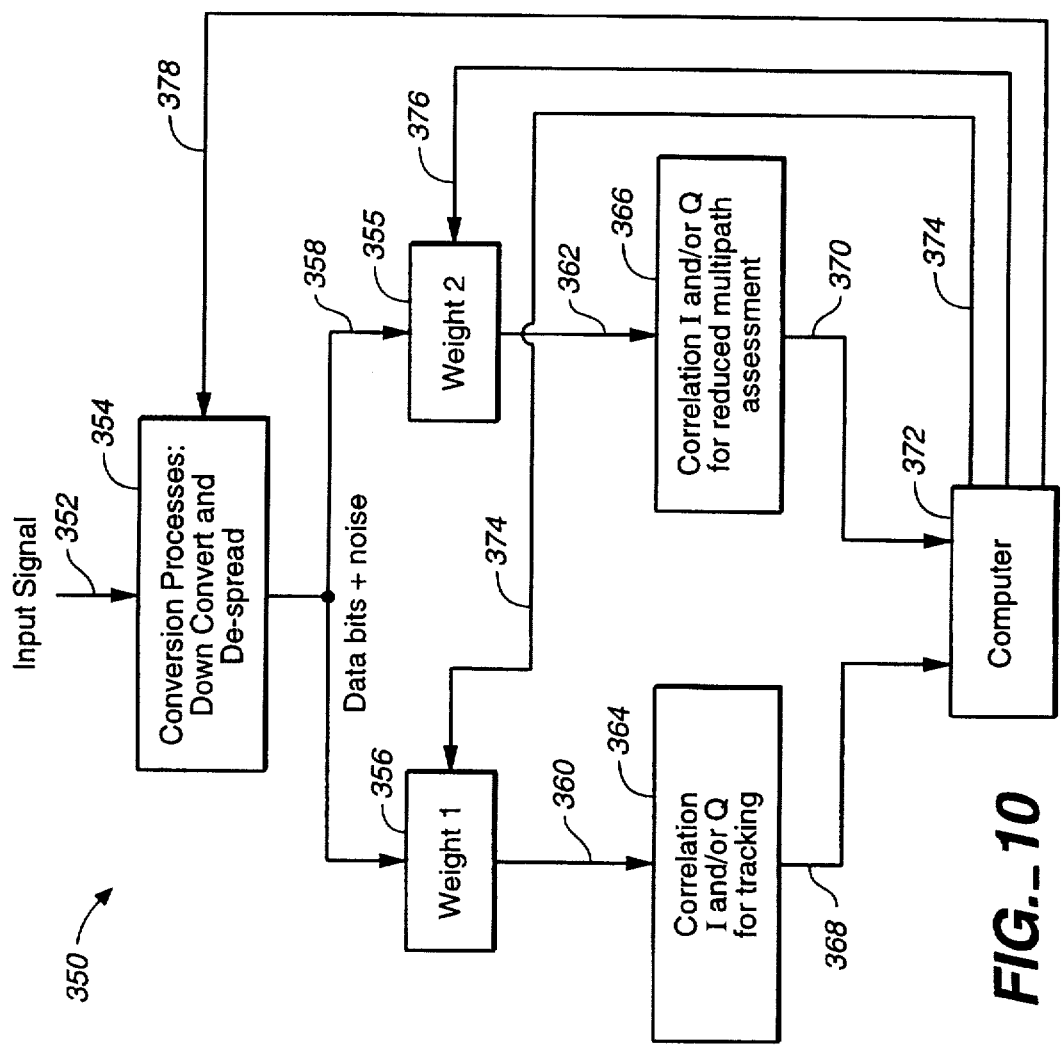
FIG._10

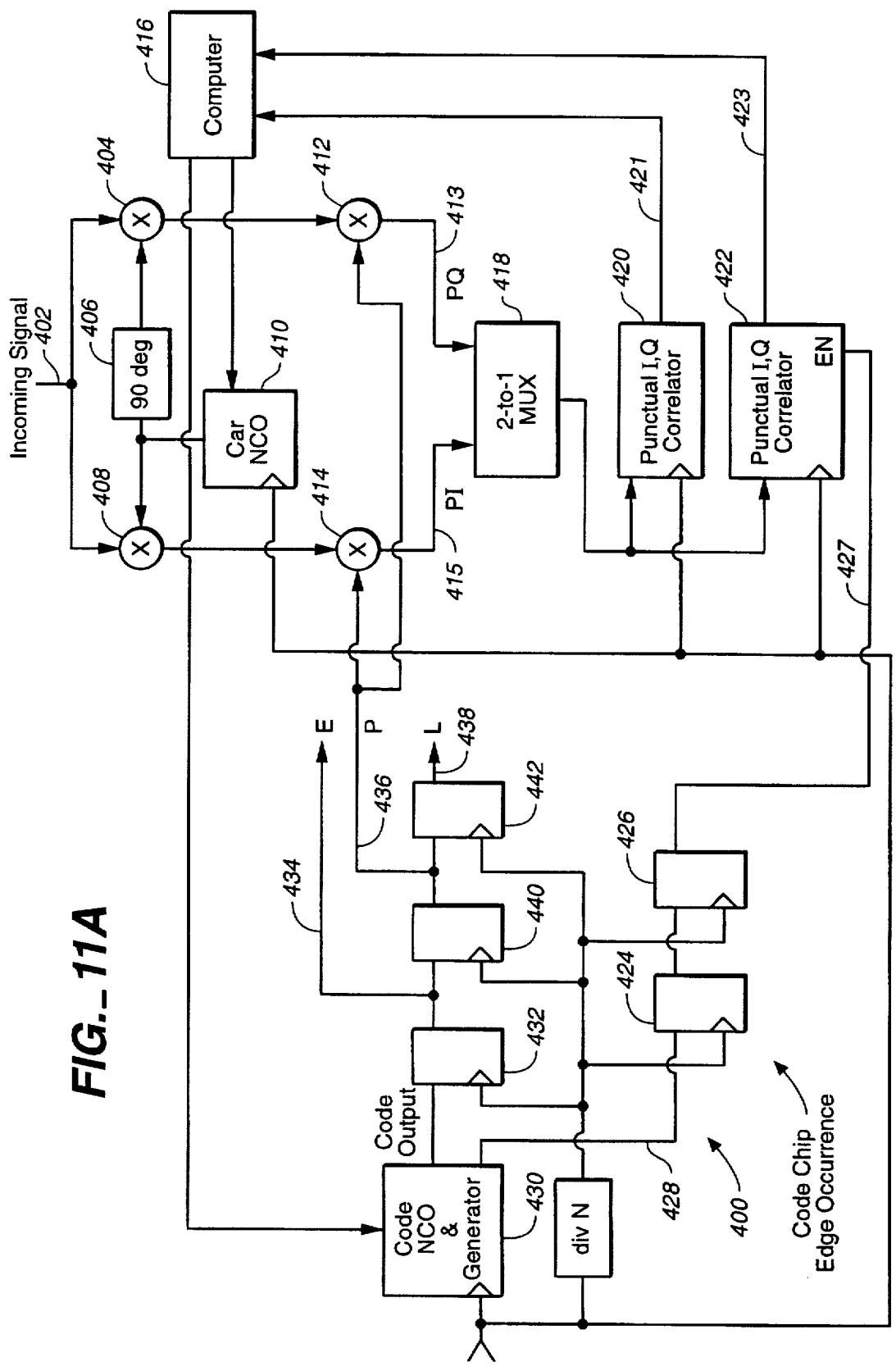
FIG._11A

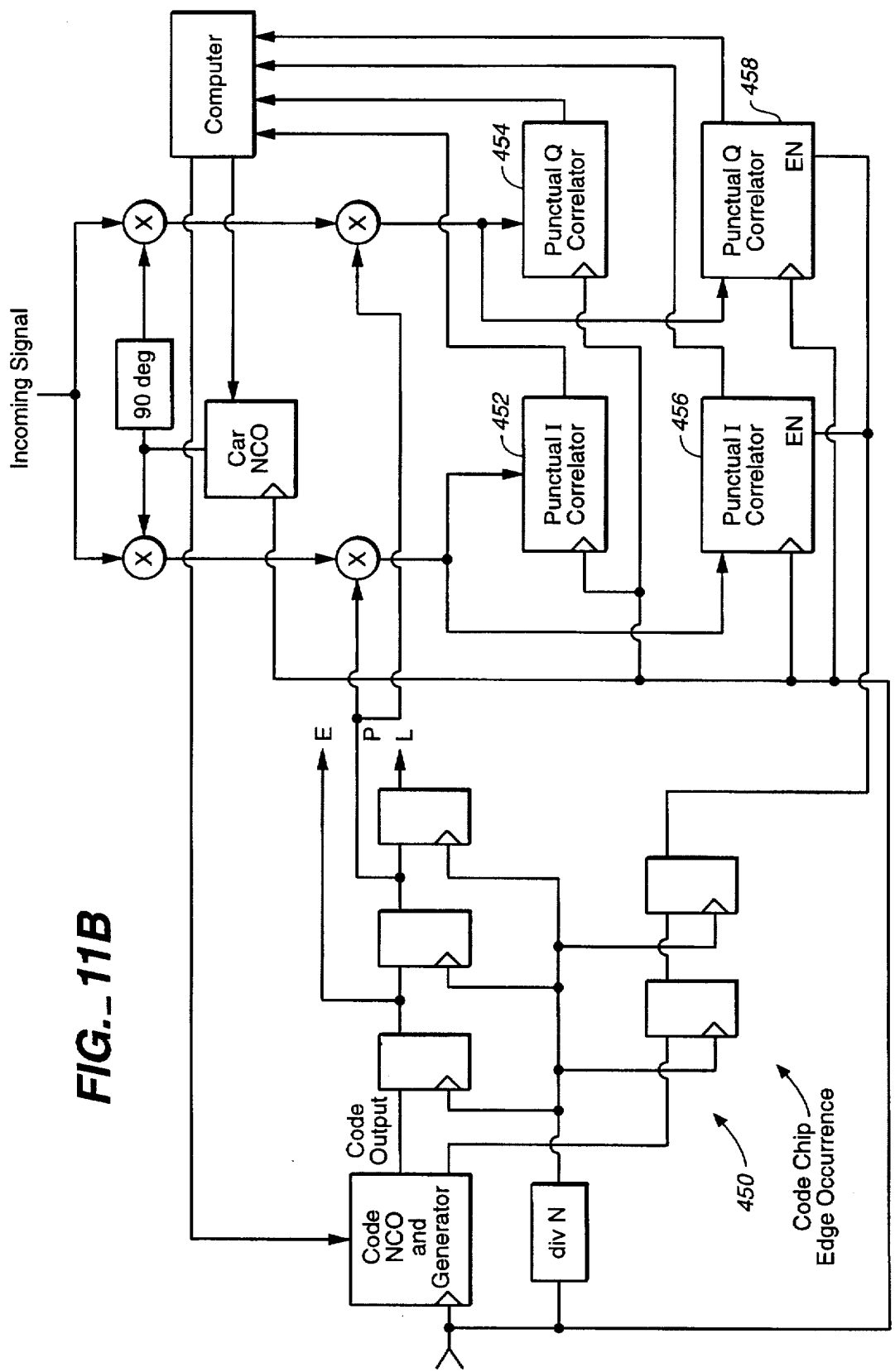
FIG._11B

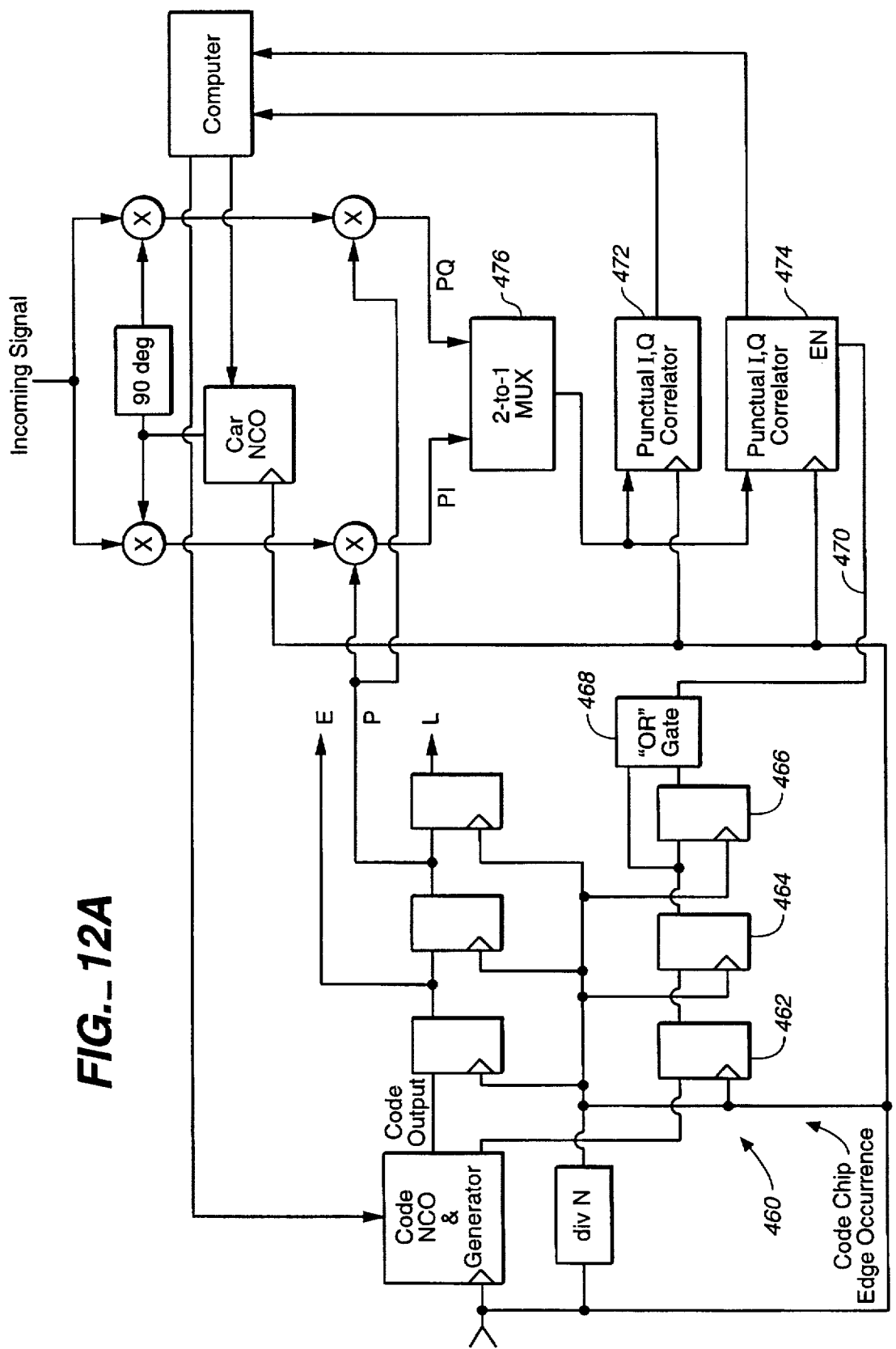
FIG._12A

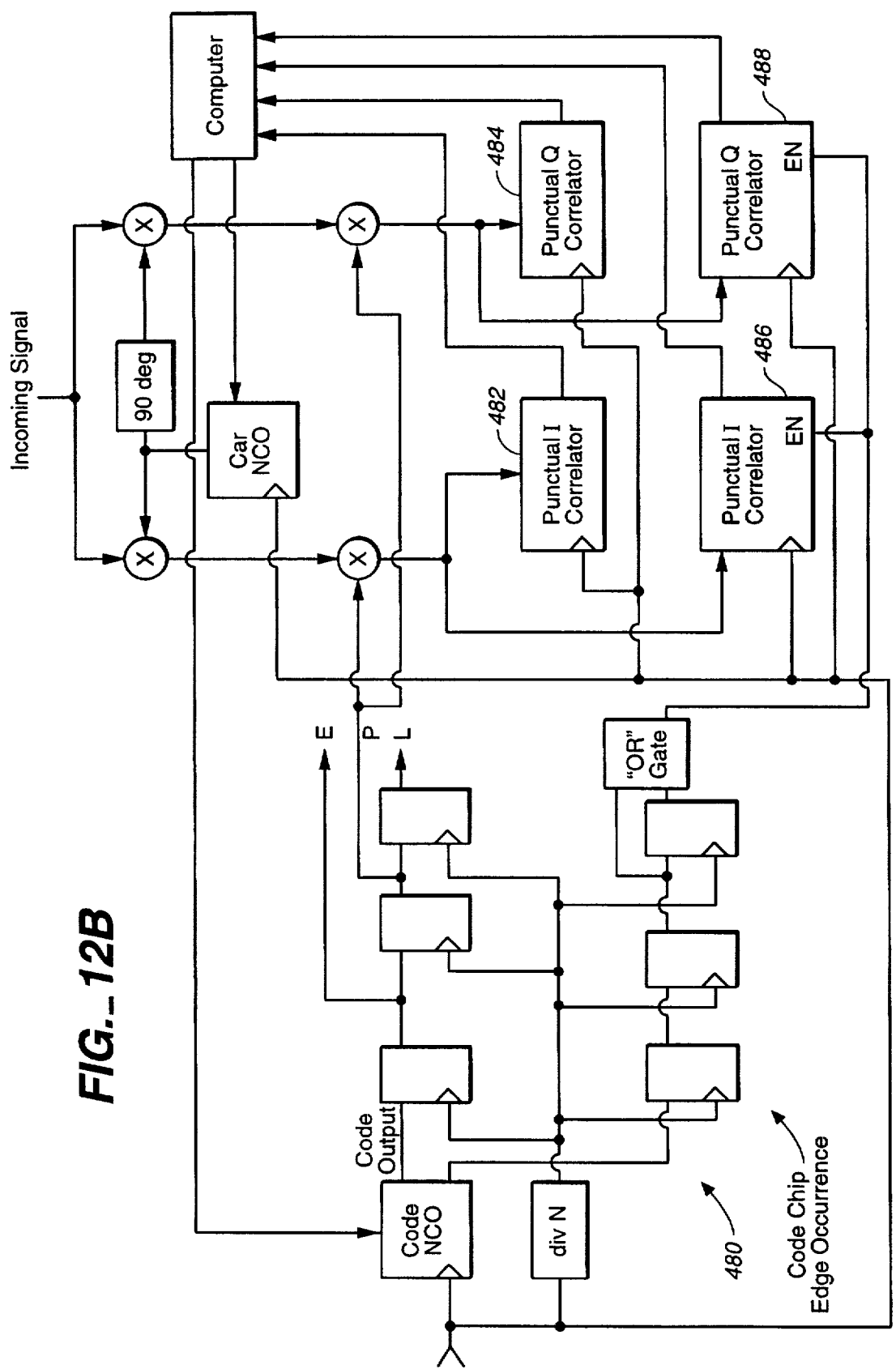
FIG._12B

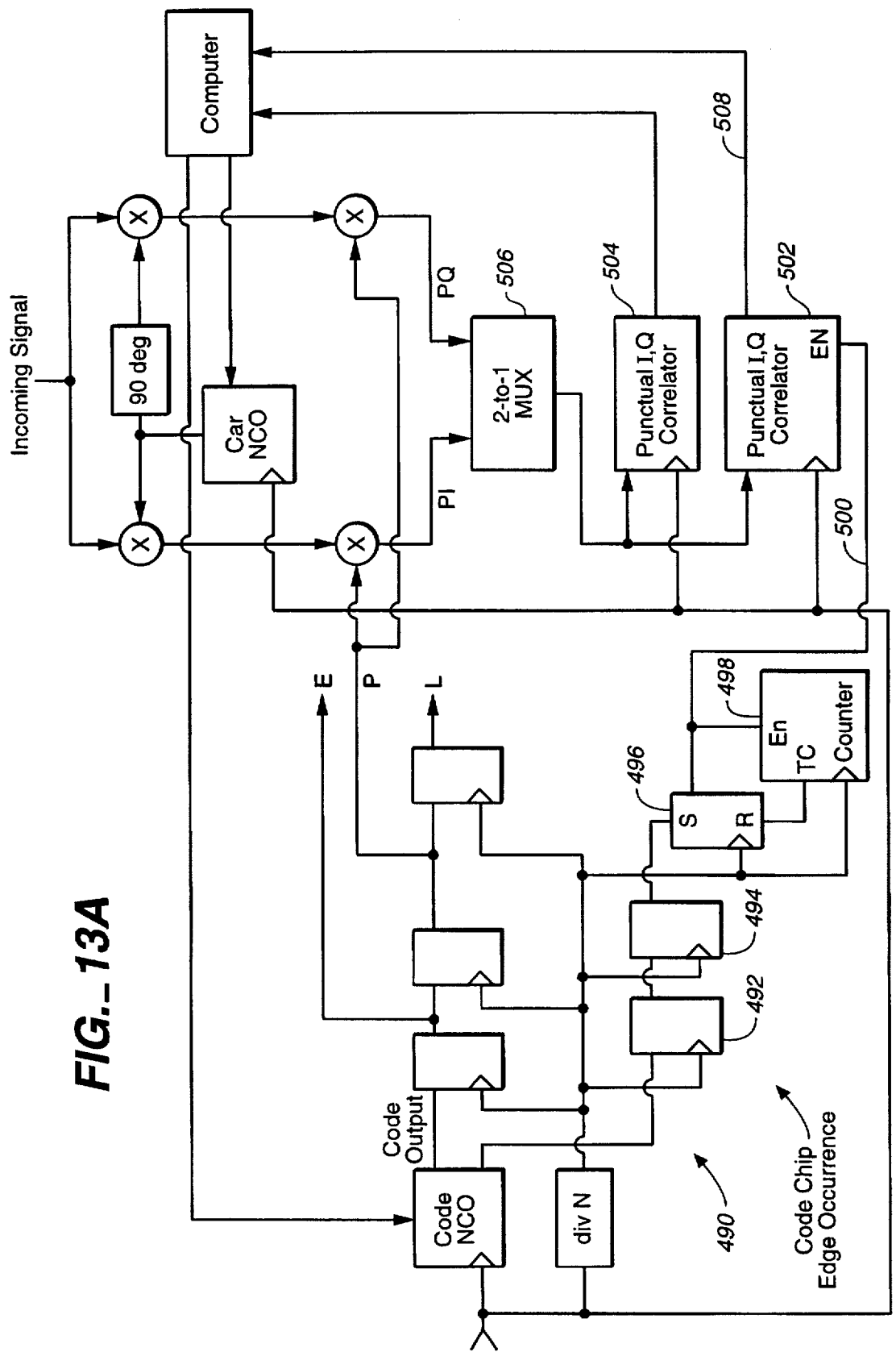
FIG._13A

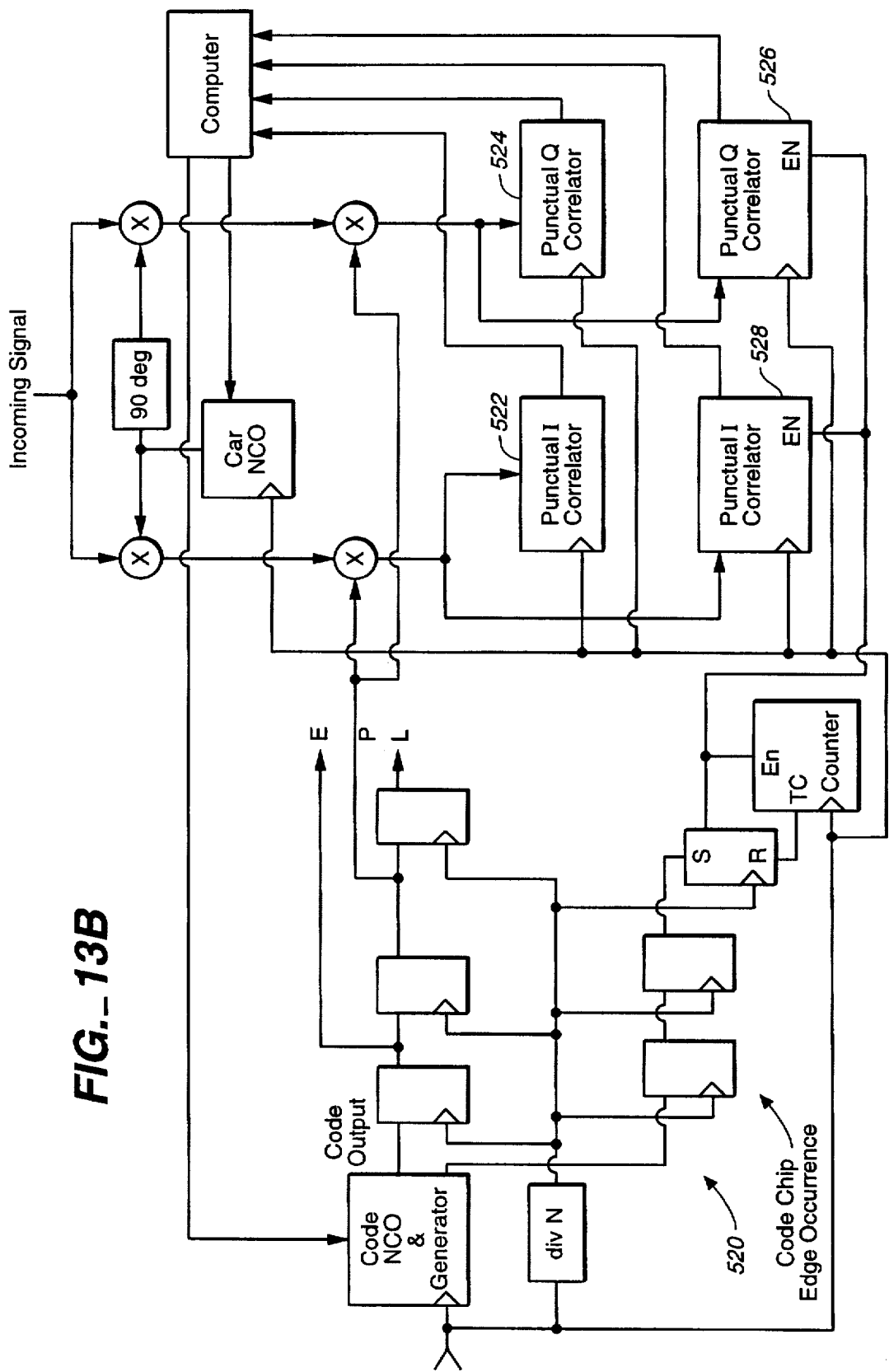
FIG._13B

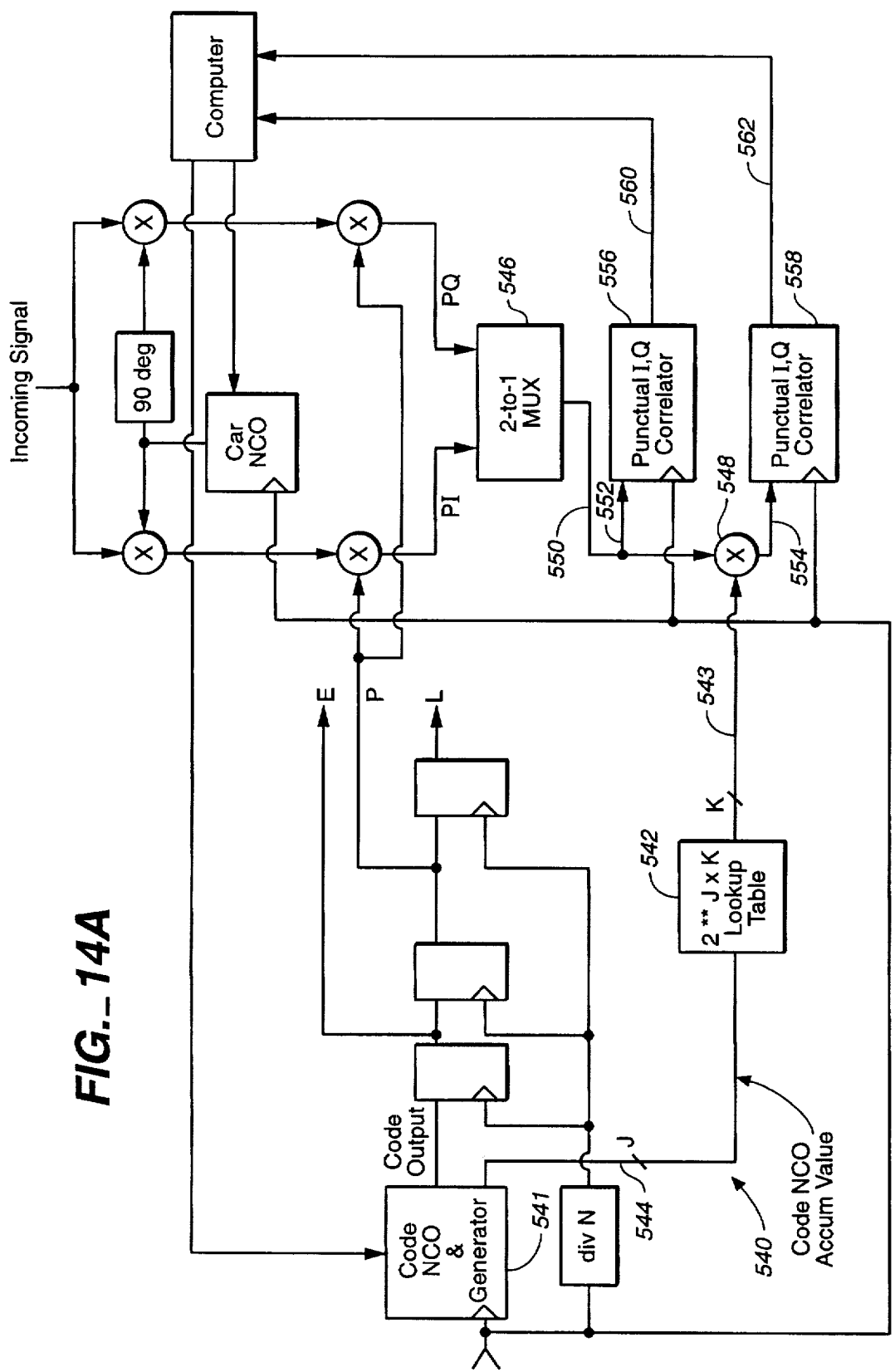
FIG._14A

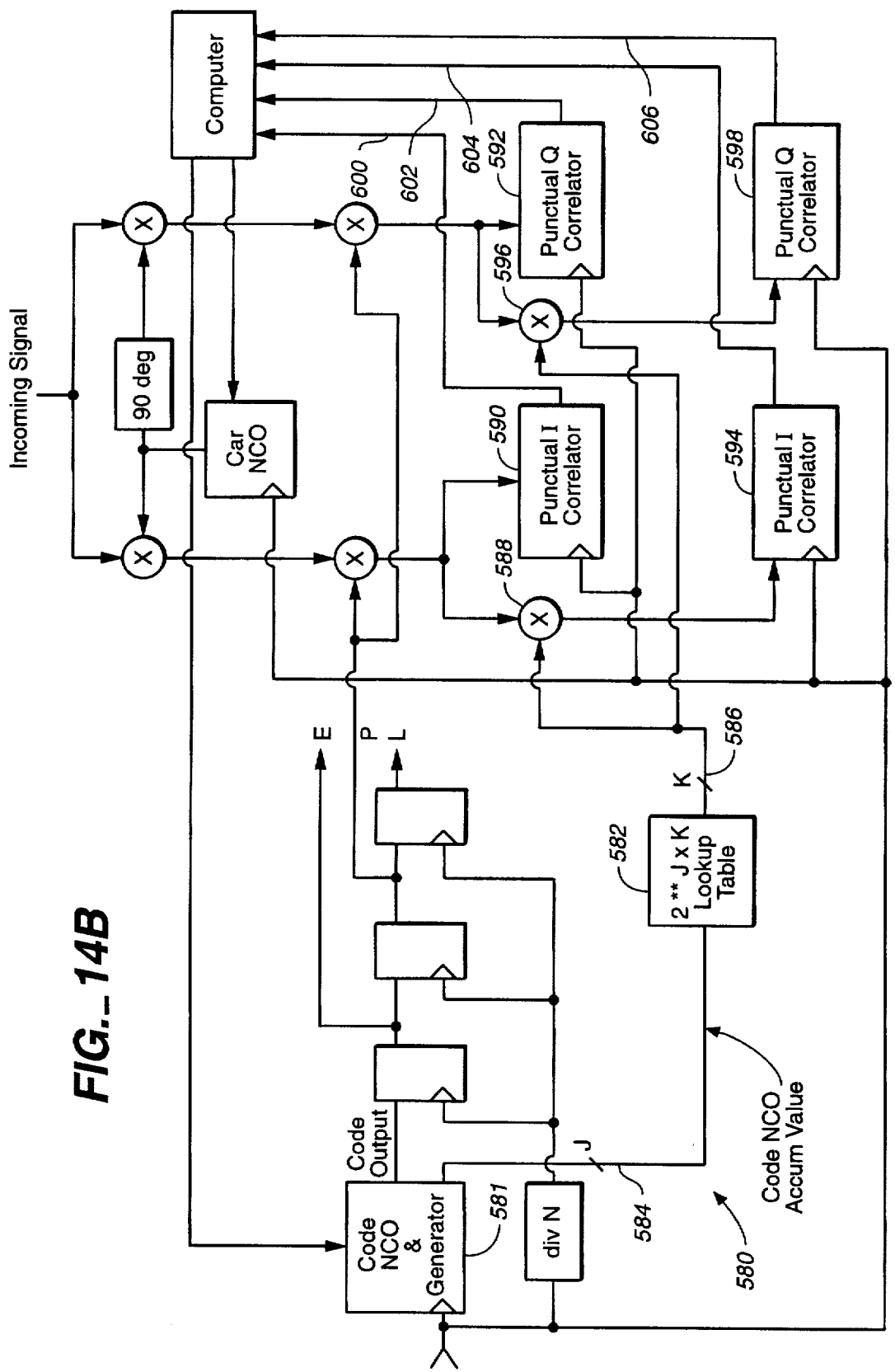
FIG._14B

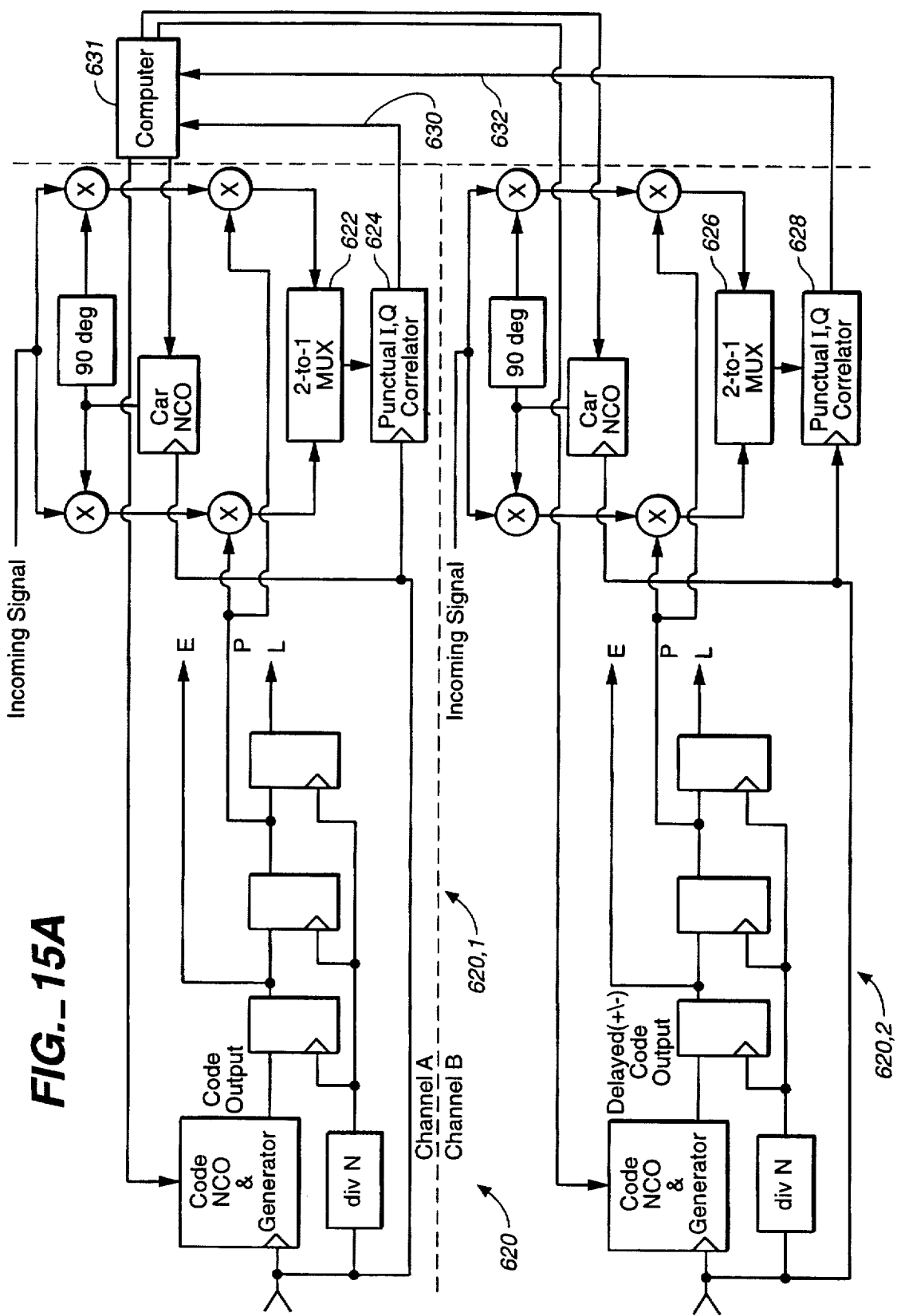
FIG._15A

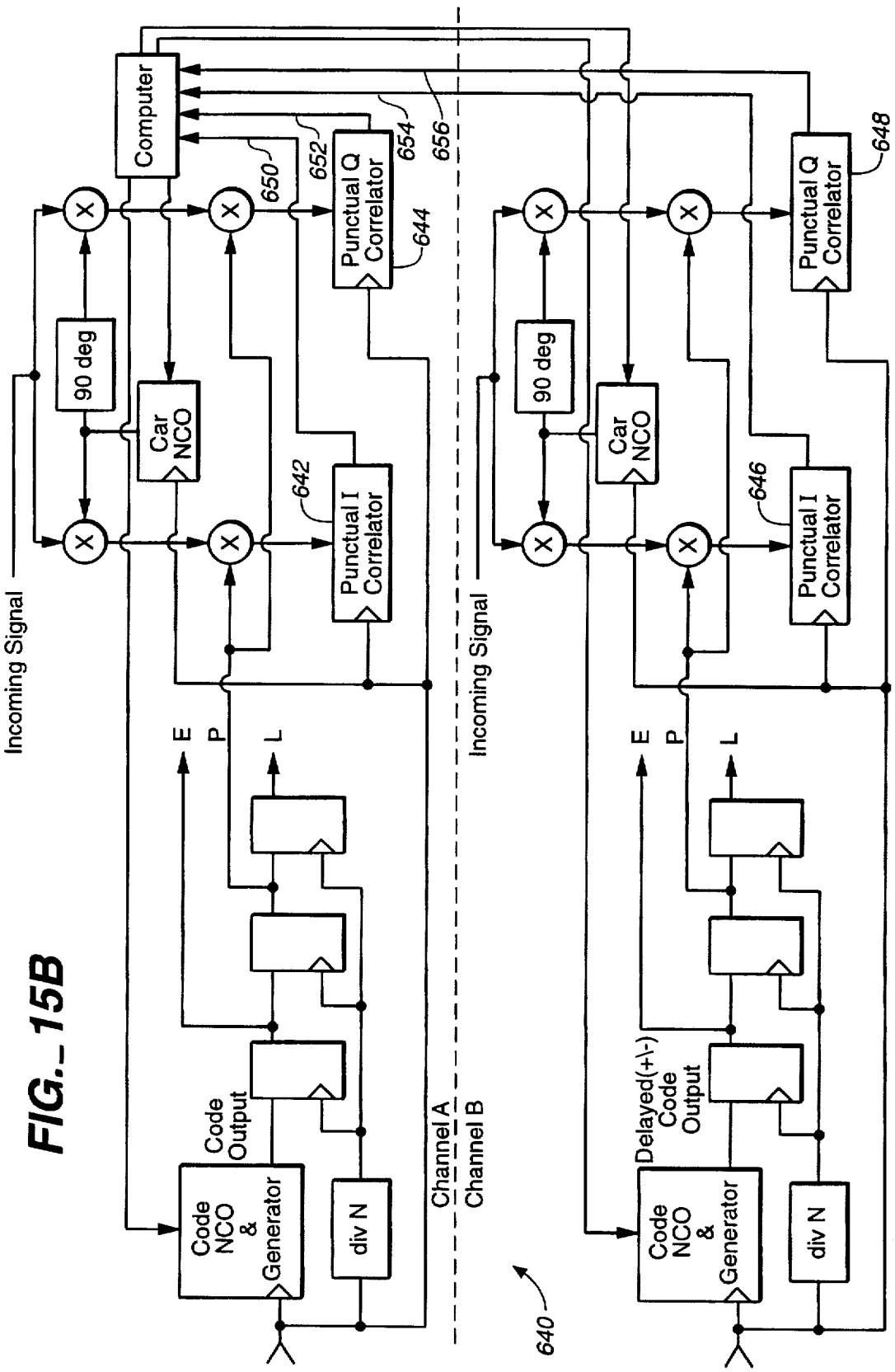
FIG._15B

WEIGHTED CARRIER PHASE MULTIPATH REDUCTION

BACKGROUND

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs at an estimated cost of about $8–10 billion. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved on Dec. 8, 1993, when the Initial Operational Capability (IOC) was declared as 24 satellites were successfully operating.

The implication of IOC is that commercial, national, and international civil users can rely on the availability of the Standard Positioning Service. Current policies quantify SPS as 100-meter, 95% position accuracy for a single user. Authorized (military) users will have access to the Precise Positioning Service (PPS), which provides a greater degree of accuracy. The PPS access is controlled by cryptographic means.

The GPS satellites transmit at frequencies L1=1575.42 MHz and L2=1227.6 MHz modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. On Jan. 31, 1994 the SA was finally implemented. The purpose of SA is to make the P-codes available only to authorized and military users. Users must be equipped with a decryption device or the "key" in order to lock on to P-codes. SA is implemented through a modification of the mathematical formula of the P-code using a classified rule. The encrypted P-code is referred to as the Y-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1-3).

Both the SPS and PPS address "classical" navigation, where just one receiver observes the satellites to determine its geocentric position. Typically, a position is computed for every epoch of observation.

However, in the surveying and geodesy applications the relative or differential positioning is used, wherein the relative location between the receivers is determined. In this case, many of the common mode errors cancel or their impact is significantly reduced. This is particularly important in the presence of selective availability.

The mutipath errors originate with contamination of SATPS signals by delayed versions of these signals. For some applications using either pseudo-range or carrier phase observables, multipath is the dominant error source. The most direct approach for reducing this error is to select an antenna site distant from reflecting objects, and to design antenna/back plane combinations to further isolate the antenna from its surroundings. In some cases, however, antennas must be located in relatively poor sites, and other techniques for carrier multipath reduction are required.

SUMMARY OF THE INVENTION

The present invention is unique because it provides a system and a method for carrier multipath reduction based on using a weighted correlation function.

One aspect of the present invention is directed to an apparatus for carrier phase multipath noise reduction of a received composite signal (CS) that includes a transmitted direct signal (DS) and at least one multipath noise signal (MS). The apparatus utilizes weighted timing function generators for reducing the multipath noise. The apparatus comprises: (1) a conversion means for down-converting the received composite signal CS into two orthogonally related signals, the first orthogonally-related signal being an inphase composite signal ICS, the second orthogonally-related signal being a quadrature composite signal QCS; (2) a first weighting function generator means for providing a first weighting timing function (F1(t)); (3) a second weighting function generator means for providing a second weighting timing function (F2(t)); (4) a first correlator means for forming a correlation signal between a reference signal and the received composite signal CS, wherein the first weighting function F1(t) is utilized for determining a first time point t1 within a clock time period τ corresponding to a first point CS1 of the waveform where the tracking of the composite signal CS is completed, and wherein the first correlator means outputs the first composite signal CS1 including a first multipath signal MP1 corresponding to the first time point t1; (5) a second correlator means utilizing the second weighting function F2(t) for determining a second time point t2 corresponding to a second point CS2 on the waveform, wherein the second correlator means outputs the second composite signal CS2 including a second multipath signal MP2 corresponding to the second time point t2, and wherein the multipath signal MS2 at the second time point t2 is reduced as compared with the multipath signal MP1 at the first time point t1; and (6) a computer means for controlling the first correlator means and for controlling the second correlator means.

In one preferred embodiment, the second weighting function F2(t) is used for selecting the second time point t2 corresponding to the second point CS2 on the waveform to be earlier than the first time point t1 selected by using the first weighting function F1(t). In another preferred embodiment, the second time point t2 corresponding to the second point CS2 on the waveform occurs later than the first time point t1. Yet, in one more embodiment, the second time point t2 occurs at the same time point as the first time point t1.

In the preferred embodiment, the apparatus of claim 1 further includes a clock timing generator means for providing the timing clock signal having the time period τ. The clock timing generator means can further include a code numerically control oscillator (NCO) means for providing a code clock with period one code chip, wherein the timing clock period τ is equal to two code chips. In one embodiment, the conversion means further includes a carrier NCO generator means for providing a carrier timing clock signal.

In one preferred embodiment, the second weighting function generator includes a one clock width weighting function generator, wherein the one clock weighting function generator is applied to the beginning of the code chip. The one clock width weighting generator can be implemented using a set of two flip-flops for providing a set of enabling signals that control the timing of the output signal generated by the second correlator means.

In another preferred embodiment, the second weighting function generator employs a two clock width weighting generator, wherein the two clock weighting function generator is applied to the beginning of the code chip. The two clock weighting function generator can be built using a set of three flip-flops and an "OR" gate for providing a set of enabling signals for controlling the timing of the output signal generated by the second correlator means.

Yet, in another preferred embodiment, the second weighting function generator further includes an N clock width weighting generator, N being an integer. The N clock weighting function generator is applied to the beginning of the code chip and can include a set of three flip-flops and a counter for providing a set of enabling signals for controlling the timing of the output signal generated by the second correlator means.

The second weighting function generator can also include an arbitrary weighting generator comprising a lookup table means for providing a means to control the contribution amount of the output signal generated by the second correlator means.

In one embodiment, the first correlator means further includes an I (inphase) channel first correlator means and a Q (quadrature) channel first correlator means, and the second correlator means further includes an I channel second correlator means and a Q channel second correlator means. After the carrier tracking is completed, the composite signal in the first Q channel is equal to zero, wherein the I channel second correlator means and Q channel second correlator means are used for making an estimate of the carrier multipath signals.

Another aspect of the present invention is directed to an apparatus for carrier phase multipath noise reduction of a received composite signal (CS) that includes a transmitted direct signal (DS) and at least one multipath noise signal (MS). The apparatus comprises a channel A means, a channel B means, and a computer means. The channel A means further includes: (1) a conversion means for converting the received composite signal into two orthogonally-related signals, the first signal being an inphase composite signal, the second signal being a quadrature composite signal; (2) a clock timing generator means for providing the timing clock signal having the time period τ; (3) a punctual inphase (I) correlator means for determining punctual amplitude of a waveform formed as a correlation signal between a reference signal and the received inphase composite signal, wherein the punctual inphase correlator means outputs a punctual inphase composite signal; and (4) a punctual quadrature (Q) correlator means for assisting in closing of the tracking carrier loop, wherein when the carrier tracking loop is closed the quadrature composite signal is equal to zero.

The channel B means further includes: (1) a conversion means for converting the received composite signal into two orthogonally-related signals, the first signal being an inphase composite signal; the second signal being a quadrature composite signal; (2) a clock timing generator means for providing the shifted-in-time timing clock signal having the time period τ as compared with the channel A timing clock signal; and (3) a punctual inphase (I) and a quadrature (Q) correlator means for determining a delayed amplitude of a waveform in the I and Q channels formed as a correlation signal between a reference signal and the received inphase composite signal, wherein the punctual inphase correlator means outputs shifted-in-time inphase and quadrature composite signals as compared with the channel A inphase and quadrature composite output signals, and wherein the I and Q channels are used for estimation of the carrier-multipath signals.

In one embodiment, the channel B punctual inphase correlator means outputs a delayed inphase composite signal as compared with the channel A punctual inphase correlator means output signal. In another embodiment, the channel B punctual inphase correlator means outputs an advanced inphase composite signal as compared with the channel A punctual inphase correlator means output signal. Yet, in one more embodiment, the channel B punctual inphase correlator means outputs an inphase composite signal that has a zero delay as compared with the channel A punctual inphase correlator means output signal.

One more aspect of the present invention is directed to an apparatus for carrier phase multipath noise reduction of a received composite signal (CS) that includes a transmitted direct signal (DS) and at least one multipath noise signal (MS). The apparatus utilizes a dynamic weighting function generator for reducing the multipath noise. The apparatus comprises: (1) a conversion means for down-converting the received composite signal CS into two orthogonally-related signals, the first orthogonally-related signal being an inphase composite signal ICS, the second orthogonally-related signal being a quadrature composite signal QCS; (2) a first dynamic weighting function generator means for providing a first dynamic weighting timing function ($\Theta1(t)$), wherein the first dynamic function $\Theta1(t)$ changes over time; (3) a second dynamic weighting function generator means for providing a second dynamic weighting timing function ($\Theta2(t)$), wherein the second dynamic function $\Theta2(t)$ changes over time; (4) a first correlator means for forming a correlation waveform as a correlation signal between a reference signal and the received composite signal CS, wherein the waveform is related to the relative strength of the orthogonally converted ICS and QCS signal, wherein the first dynamic weighting function $\Theta1(t)$ is utilized for determining a first time point t1 within a clock time period τ corresponding to a first point CS1 of the waveform, wherein at the first the point t1 the tracking of the composite signal CS is completed, and wherein the first correlator means outputs the first composite signal CS1 including a first multipath signal MP1 corresponding to the first time point t1; (5) a second correlator means employing the second dynamic weighting function Θ2(t) for determining a second time point t2 corresponding to a second point CS2 on the waveform, wherein the second correlator means outputs the second composite signal CS2 including a second multipath signal MP2 corresponding to the second time point t2, and wherein the multipath signal MS2 at the second time point t2 is reduced as compared with the multipath signal MP1 at the first time point t1; and (6) a computer means for controlling the first correlator means and for controlling the second correlator means.

One additional aspect of the present invention is directed to an apparatus for carrier phase multipath noise reduction of a received composite signal (CS) that includes a transmitted direct signal (DS) and at least one multipath noise signal (MS). The apparatus utilizes a weighted timing function generator for reducing the multipath noise. The apparatus comprises: (1) a conversion means for down-converting the received composite signal CS into two orthogonally-related signals, first orthogonally-related signal being an inphase composite signal ICS, second orthogonally-related signal being a quadrature composite signal QCS; (2) a weighting function generator means for providing a weighting timing function (F(t)); (3) a weighted Inphase and Quadrature correlator means, wherein the weighting function F(t) is utilized for determining a first time point t1 within a clock time period τ corresponding to a first point CS1 of the waveform, and wherein at the first time point t1 the tracking of the composite signal CS is completed, and wherein the multipath signal MS1 at the first point CS1 is reduced as compared with the situation when the weighting function F(t) is not employed; and (4) a computer means for controlling the weighted correlator means.

Yet, another aspect of the present invention is directed to a method for carrier phase multipath noise reduction of a received composite signal (CS) that includes a transmitted direct signal (DS) and at least one multipath noise signal (MS). The method comprises the following steps: (1) converting the received composite signal CS into two orthogonally-related signals using a conversion means, the first orthogonally-related signal being an inphase composite signal ICS, the second orthogonally-related signal being a quadrature composite signal QCS; (2) determining a first time point t1 within a clock time period τ corresponding to a first point CS1 of a waveform by employing a first correlator means, wherein the waveform is formed as a correlation signal between a reference signal and the received composite signal CS, and wherein the waveform is related to the relative strength of the orthogonally converted ICS and QCS signals; (3) providing a weighting timing function (F(t)) by using a weighting function generator means; (4) determining a second time point t2 corresponding to a second point CS2 on the waveform by using a second correlator means, wherein the second correlator means utilizes the weighting function F(t), and wherein the multipath signal MS2 at the second time point t2 is reduced as compared with the multipath signal MP1 at the first time point t1; and (5) performing the control function of the first correlator means and the second correlator means by using a computer means.

BRIEF DESCRIPTION OF THE DRAWINGS

FIG. 1 is a plot of a composite autocorrelation function showing how the autocorrelation function expands due to multipath and showing the timing definitions.

FIG. 2 is a plot of a composite autocorrelation function showing how the autocorrelation function contracts due to cancelling multipath.

FIG. 3A illustrates a current standard architecture for obtaining PI and PQ correlator sums in a two punctual correlator embodiment.

FIG. 3B shows a current standard architecture for obtaining PI and PQ correlator sums in a one punctual correlator embodiment.

FIG. 4A is a depiction of composite signal (CS) in I and Q coordinate system.

FIG. 4B shows the change of the composite signal (CS) over time, wherein amplitude of the multipath MP does not change.

FIG. 4C is an illustration of how the composite signal (CS) changes over time, wherein phase delay of the multipath MP does not change.

FIG. 5 is a depiction of the time characteristic of the carrier autocorrelation function $AF_{carrier}$ comprising the direct autocorrelation function, and the multipath autocorrelation function components.

FIG. 6A depicts an incoming satellite signal after first conversion.

FIG. 6B illustrates a replica of an incoming satellite signal after first conversion.

FIG. 6C shows a situation without weighting function

FIG. 6D illustrates a constant weighting function.

FIG. 6E is a depiction of a dynamic weighting function that changes over time.

FIG. 6F shows an effect of different weighting function on a carrier autocorrelation function.

FIG. 7A is an illustration of an incoming satellite signal after first conversion.

FIG. 7B is a depiction of a Punctual replica of an incoming satellite signal after first conversion.

FIG. 7C illustrates a Late replica of an incoming satellite signal after first conversion.

FIG. 7D shows a (one minus weighting function) obtained from the Late and Punctual replica of the satellite signal of FIG. 7C.

FIG. 7E is an illustration of a Very Early replica of the incoming signal.

FIG. 7F shows a weighting function obtained from the Very Early and Punctual replica of the satellite signal of FIG. 7E.

FIG. 8A shows a left side weighting function having width of one master clock period.

FIG. 8B illustrates a left side weighting function having width of two master clock periods.

FIG. 8C shows a left side weighting function having width of N master clock periods, N being an integer.

FIG. 9A shows a channel A Punctual replica of an incoming satellite signal after first conversion.

FIG. 9B illustrates an advanced channel B Punctual replica of an incoming satellite signal after first conversion.

FIG. 9C shows a delayed channel B Punctual replica of an incoming satellite signal after first conversion.

FIG. 10 illustrates a generic architecture for dynamically weighted PI and PQ sums.

FIG. 11A depicts an architecture for a pair of weighted and unweighted PI and PQ sums having a one-clock width weighting multiplexed correlators.

FIG. 11B is an illustration of an augmented architecture for obtaining weighted PI and PQ sums with a one-clock width weighting correlators.

FIG. 12A shows an architecture for weighted PI and PQ sums having a two clock width weighting multiplexed correlators.

FIG. 12B is a depiction of an augmented architecture for obtaining weighted PI and PQ sums with a two-clock width weighting correlators.

FIG. 13A illustrates an architecture for weighted PI and PQ sums with multiplexed correlators having an N clock width weighting multiplexed correlators.

FIG. 13B shows an augmented architecture for obtaining weighted PI and PQ sums with an N clock width weighting correlators.

FIG. 14A is a depiction of an architecture for weighted PI and PQ sums with multiplexed correlators having an arbitrary weighting multiplexed correlators.

FIG. 14B illustrates an augmented architecture for obtaining weighted PI and PQ sums with an arbitrary weighting correlators.

FIG. 15A shows a two-channel architecture including a left side weighting of arbitrary width single multiplexed correlators for obtaining weighted PI and PQ sums.

FIG. 15B is a depiction of an augmented two-channel architecture for obtaining weighted PI and PQ sums with a left side weighting of arbitrary width correlators.

FULL DESCRIPTION OF THE PREFERRED EMBODIMENT

In general, the subject of the present invention comprises an apparatus and a method for use in decoding an arbitrary composite signal (CS) (not necessarily a satellite signal) that includes a distortion component. The apparatus that performs the above identified functions in general should include the following blocks: (1) a first generating means for generating a reference signal; (2) a second generating means for generating a time varying weighting signal which, when mixed with the composite signal and the reference signal, suppresses the distortion component; and (3) a mixing means for mixing the reference signal, the time varying weighting signal, and the composite signal to produce a first correlation resulting signal that represents a timing relationship between the composite signal and the reference signal.

In particular, the present invention can relate to the radio receivers of the satellite signals. Radio receivers for the SATPS navigation data bit stream are commonly referred to as correlation receivers. Correlation receivers are typically employed because they are designed for situations encountered in satellite broadcasting where the strength of the SATPS signal is quite weak compared to the noise level. En order to boost the weak signal without amplifying the noise, it is the practice to use spread spectrum modulation in SATPS satellite systems. The spread spectrum technique modulates the satellite transmission by the individual satellite identification code, and this has the effect of spreading the satellite signal over a bandwidth that is determined by the reciprocal of the pulse width. The receiver multiplies the signal received on the ground by a replica of the individual satellite code, and this kind of demodulation is generally known as correlation. Spread spectrum systems are more fully described by M. Simon, J. Omura, R. Scholtz, and B. Levitt in the "Spread Spectrum Communications Handbook", McGraw-Hill, Inc., 1994.

A particular advantage of using spread spectrum modulation is that it allows the time of arrival of the transmitted signal to be determined by the receiver. The time-of-arrival measurement is used to calculate the pseudo-range, which is the first estimate of the distance between the receiver and a SATPS satellite. The carrier tracking allows one to obtain the second and more precise estimate of the distance between the receiver and a SATPS satellite. Therefore, at first we discuss the correlation process between two codes: the incoming code and the locally-generated code.

Determining the time of arrival of a signal requires the recognition of at least a portion of the incoming signal and a comparison of the time of arrival of the incoming signal with the time that it was known to have been transmitted. This measurement is made by aligning the incoming code and the local code using a code tracking loop, and by multiplying the incoming satellite signal with the locally-generated replica of the spread spectrum code. To produce measurable signal power at the receiver, the incoming signal and the local replica are required to be aligned with each other within one cycle of the code clocking rate. This one cycle at the clocking rate is also referred to as "chip". If the two codes are within one chip of each other, some measurable signal power will be observed at the output of the receiver correlator, and the closer the two codes are aligned, the greater is the power that will be observed. The relationship of the delay time between the two codes to the amount of signal power observed at the output of the correlation operation is called the autocorrelation function (AF). It will be appreciated that peak received power will be detected when the two codes are perfectly aligned in time.

The ideal autocorrelation between two spread spectrum codes (curve 12) is shown in FIG. 1. The true autocorrelation function between two spread spectrum signals in a real receiver (14) is different from the ideal curve 12. The peak of the curve 14 is not sharp, and the leading and trailing slopes from the peak are not straight. This rounding of the ideal triangular shape is caused by the use of the finite-bandwidth filters in the receiver prior to correlation. The information used to close the code tracking loop is taken from early E (13) and late L (15) comparisons of the local and incoming codes.

One troublesome kind of interfering signal is known as multipath. Multipath refers to the phenomena in radio wave propagation wherein a receiver system is able to collect a so-called primary (direct) signal, representing the direct pat of radio wave propagation between the source and the receiver, and also a plurality of secondary delayed versions of the direct signal, representing reflections of the direct signal from objects adjacent the direct path. This phenomena is particularly acute in receiver systems with large coverage-area antennas, such as commonly found in GPS systems. The magnitude of multipath error induced in GPS systems has been reported by J. M. Tranquilla et al., "GPS Multipath Field Observations at Land and Water Sites", Navigation Journal of the Institute of Navigation, Vol. 37, No. 4, 1990-91.

These secondary signals have been found to have several important characteristics in relation to the direct signal. For example, the secondary signals always have a delayed time-of-arrival compared to the direct signal, because the secondary signals travel a slightly longer path than the direct signal. Furthermore, the respective amplitudes of the secondary signals are nearly always less than that of the direct signal, because the reflections attenuate the direct signal. For correlation receivers using digital modulations, multipath code phase signals with delays greater than one chip are completely uncorrelated, and can be ignored. FIG. 1 illustrates a composite autocorrelation function with additive distortions (10). It shows that the multipath signal 22 causes the composite autocorrelation function 16 to have a larger voltage level at the true late L time point 20 than the direct autocorrelation function 14. The timing error is the difference between the real late point L (15) and the composite late point L' (18).

Finally, the multipath signal distance, that is the differential path length variation from the direct signal path, varies over the wavelength of both the carrier phase and the code phase. For example, in GPS the carrier phase wavelength is 19 cm ($\lambda$=c/1575 MHz, where c=the speed of light), but the code wavelength is much longer, because the code frequency is as low as 1.023 MHz. As a result, the multipath carrier signal can either add to the desired direct signal or subtract from it. FIG. 2 is a depiction of the code composite autocorrelation function 30 with cancelling distortions due to the multipath effect. It shows that the composite autocorrelation function 32 has a smaller amplitude than the direct autocorrelation function 34 due to the negative multipath autocorrelation function 36.

The effect of the multipath on the code autocorrelation function is munch more severe than on the carrier autocorrelation function because the code chip wavelength ($\lambda$ code=300 meters) is much larger than the carrier wavelength ($\lambda$ carrier=19 (24) cm). Accordingly, in the noise spectrum the code multipath noise component occupying the same frequency band (1/(3-5) min) as the carrier multipath noise, has the mulch bigger amplitude:
Amplitude_Code_Multipath_Noise/Amplitude_Carrier_Mutipath_Noise=(0-10 meters/0-5 cm).

However, the carrier phase measurements are used for much more accurate GPS determination of the distance from a user to the satellite. Therefore, the effects of carrier multipath can not be ignored.

Indeed, the absolute position accuracy of a GPS navigation solution is essentially limited by systematic errors in the satellites and other signal degrading influences such as Doppler offsets, ionospheric effects, and other causes. The GPS specification is such that users can get position fixes to a three-dimensional accuracy of about 100 meters. The magnitude of the multipath effect has a maximum of around 10 meters for coarse acquisition (C/A) code and 5 meters for precision (P) code. Therefore, in the navigation mode the multipath error is largely masked by other system errors.

However, in the GPS-differential and survey applications the satellite-based systematic effects are removed by differencing between two co-located receivers, wherein two receivers are located at any arbitrary distance apart in order to get another set of equations relating to satellite uncertainties. In these applications the largest error source affecting the pseudo-range, after receiver and ionospheric effects have been removed, is caused by multipath signals.

The differential survey method achieves a relatively high accuracy from measurements based on the carrier phase of the received signal. Because the wavelengths of the two GPS frequencies are small, 19 and 24 cm, respectively, accuracies of much less than 1 m are possible. The problem with a time-of-arrival measurement based on carrier phase is that the time-of-arrival of each carrier phase cycle is ambiguous, that is, one carrier cycle cannot be distinguished from any other carrier cycle. The post-processing technique can resolve the carrier phase ambiguity if the two receivers remain stationary for about one hour. Thus the multipath-induced errors up to 10 meters are a major stumbling block to decreasing measurement time. The disclosed apparatus directly deals with this problem and allows to decrease the multipath induced carrier phase distortions without significantly increasing the measurement time.

The basic elements of a current architecture (40) for obtaining Punctual Inphase (PI) and Punctual Quadrature (PQ) correlator sums are shown in FIG. 3A. The incoming spread spectrum signal 42 is received by an antenna and low noise amplifier, and is mixed to baseband in a mixing stage 48 by a local carrier signal generated by a carrier NCO (numerically controlled oscillator) 50. This mixing is performed in mixing stages 48 and 44, so that quadrature (Q) and inphase signals (I) are available at baseband frequency to facilitate carrier tracking.

The receiver 40 (see FIG. 3A) receives a composite signal (CS) comprising an incoming direct signal (D) and a multipath signal (MP) after the carrier tracking is locked. The Code NCO and Generator 58 provide the code replica output to the first flip-flop 64. The master clock divided by N (in the preferred embodiment N=1) 61 drives the Early 64 flip-flop, the Punctual flip-flop 66, and the Late flip-flop 68. The Carrier NCO 50 provides a clocking signal that drives (see FIG. 4A) the Q component 103 of the composite signal $CS_Q$ to zero, and drives the inphase component 106 of the composite signal $CS_I$ to maximum. The phase error $\theta$ (109) indicates the phase delay between the mutipath signal MP(111) and the direct signal D (108).

Both the amplitude of the MP signal (Amplitude_MP) and the phase of the multipath signal (Phase_MP) changes over time. If Amplitude_MP (136) does not change over time, than the change of the composite signal CS (132) during one cycle of the carrier phase is depicted in FIG. 4B. If Phase_MP 126 (or the phase error $\alpha$) does not change over one carrier cycle, then the change of the composite signal 128 over time is shown in FIG. 4C, wherein the maximum MP signal is equal to the direct D signal, and wherein the composite signal can change from zero to MAX CS signal.

In general, both amplitude and phase of the MP signal changes. The maximum phase error $\alpha$ of the composite signal (in comparison with the direct signal) corresponds to +(-) 90 degree wherein MP is equal to D. Thus, the maximum delay constitutes ¼ of carrier wavelength (or approximately 5 cm), and the minimum is zero. See FIG. 4B.

FIG. 5 is a depiction of an ideal (for a receiver including a filter with an infinite bandwidth) time characteristic of a composite signal carrier autocorrelation function 156 comprising a direct autocorrelation function 162 and a multipath autocorrelation function 164 components. The delay of importance 168 for the multipath is always less than 1 code chip because two multipath signals do not Correlate if they occur during two different chip periods. The multipath has the most effect on the punctual direct signal (160) and the least on the Very Early direct signal (170). This results in the time offset (or error signal) between adjacent correlation sums. If MS delay 168 is greater than the Very Early time point $\tau 1$ (166) (delay>$\tau 1$), then the multipath- has no effect on the carrier tracking. It follows that, instead of taking a composite signal carrier autocorrelation function at the Punctual point 158, it is sufficient to take the composite signal carrier autocorrelation function at the Very Early point 170 in order to minimize the multipath effect on the carrier tracking. Indeed, if this is a case, only the multipath signals MS with delays less than Very Early time point 170 (delay<$\tau 1$) would contribute to the multipath distortion effect on the carrier tracking. To further minimize multipath effect on the carrier tracking, it is sufficient to minimize the time point $\tau 1$ of the Very Early time point 170. If the min $\tau 1$ is less then delay from any potential mutipath signal MS, than the effect of the multipath on the carrier tracking can be eliminated altogether. It can be done by introducing into the current standard architecture for obtaining PI and PQ correlator sums of FIG. 3A the generator of weighted correlation function that would allow performance of the autocorrelation of the composite signals at the Very Early point instead taking the autocorrelation function at the Punctual Point.

FIGS. 6A–6F illustrate the concept of the weighted correlator function and its effect on the autocorrelation of the composite signals. FIG. 6A depicts the satellite signals having a master clock timing and modulation by the code during the code chip time period τ. FIG. 6B is the replica of the incoming satellite signals having similar timing characteristics. FIG. 6C introduces the weighted function equal to one, that is no weighting. FIG. 6D shows the weighted function F(t) 186 having the constant period equal to the code chip period τ. The effect of such weighted correlation is shown in FIG. 6F. If the F(t)=1 (FIG. 6C), the effect on the autocorrelation function 202 is zero. If the weighted function F(t) is periodic with period of the code chip τ (see FIG. 6D), and is equal to one only during the time period τ1, the effect of such weighted correlation function on the autocorrelation function of the composite signal is shown in FIG. 6F as the autocorrelation function 206–204. The effect of the multipath is limited to the portion 206 having duration τ1 to the left from the punctual point 210.

FIG. 6D is an illustration of the dynamic weighted function Θ(t) 190 having the arbitrary timing dependence. The ideal solution to the multipath problem is to completely remove the portion 206 from the composite autocorrelation function. If the dynamic weighted function Θ(t) is equal to the δ(t)-function, the autocorrelation function 212 having zero left portion will be realized and the multipath will be completely eliminated.

The weighting function F(t) can be constructed by using the Punctual and Late replicas of the satellite signals as illustrated in FIGS. 7A–7F. In one preferred embodiment, the weighting function F1(t) can be built (see 270 of FIG. 7F) by comparing an in-correlation (I-In) and out-of-correlation (O-Out) portions of the Punctual (230 of FIG. 7B) and Late replica (240 of FIG. 7C).

In the other embodiment, the weighting function F1 (t) (270 of FIG. 7F) is built by comparing the in-correlation (I) and out-of correlation (O) portions of the Punctual replica (230 of FIG. 7B) and the Very Early replica (260 of FIG. 7E). By using the weighting function F1 (t) of FIG. 7F, the multipath noise and all other system noise is reduced because the autocorrelation function 202 is replaced by the autocorrelation function 212 (see FIG. 6F).

The class of non-uniform weighting functions comprises any weighting function that is non-uniform over a one chip period. Most weighting functions which satisfy this criteria will provide reduced multipath contribution to the carrier phase measurement as compared with the standard uniformly weighted correlation, assuming a uniform distribution of multipath signals across the one chip period. If the multipath distribution is not uniform, then we might have only two multipath signals with delay and amplitude such that they exactly cancel each other. If we were to impose a non-uniform weighting on this non-uniform distribution of multipath signals, then we might remove one of the multipath signals, thereby resulting in a net multipath signal error. The different apparatuses can be implemented using the generator of weighted correlation utilized for the multipath carrier distortion reduction.

The apparatuses in FIGS. 11B, 12B, and 13B use the assumption that when the code NCO state crosses a chip boundary, a single Code Chip Occurrence pulse is provided to signal this fact.

The generic architecture (350) for the weighted Punctual Inphase and Punctual Quadrature sums is described in FIG. 10. The input signal 352 is down-converted and de-spread in the conversion processes block 354. The weight 1 function generator 356 and the weight 2 function generator 358 non-uniformly weight the contribution to the correlators. The weighted signals 360 are correlated in the correlation block 364, wherein the I and Q tracking is performed and the carrier tracking loop is closed. The second correlator block 366 correlates the weighted signals 362 for reducing the carrier multipath impact on the obtained satellite information according to the general principles of the multipath reduction using the weighted correlation discussed above. The computer 372 controls the functioning and synchronization of all devices employed in the circuit 350.

In one preferred embodiment, the architecture for weighted Punctual Inphase and Punctual Quadrature weighted correlation apparatus is depicted in FIG. 11A. The generator of weighted function (block Weight 2 355 of FIG. 10) is implemented by employing a one master clock width weighting multiplexed correlators. In one embodiment, this can be done by passing the Code Chip Edge Occurrence 428 outputted by the Code NCO 430 through the flip-flops 424 and 426 in order to generate an Enable signal (427) on a new set of correlators for the Punctual I and Punctual Q (422). The correlators 422 are enabled on the first clock after the Code NCO 430 crosses a chip boundary, thereby providing a left side weighting function of one-clock width where the weight is 1, and is 0 everywhere else. (See FIG. 8A). The standard Punctual I and Q correlators 420 are used to close the carrier tracking loop. The standard correlators 420 provide the fill signal, and therefore the best noise performance corrupted by multipath. The weighted I and Q correlators 422 only provide a measure of the error due to multipath, and can be used to decrease the multipath distortion effect on the final carrier measurement.

In another embodiment, the weighted punctual correlators 422 are used both for closing the carrier loop and for multipath reduction. In this embodiment, the standard punctual correlators 420 are not used. This embodiment is feasible only if the weighting function is chosen correctly. If for instance, the weighing function has a very small width of non-zero region, then the architecture without standard punctual correlators 420 is not feasible.

Yet, in one more embodiment, both standard and weighted correlators can be employed by time-multiplexing the single set of Punctual correlators, wherein the most time the correlators are in the "standard mode" monitoring the signal in Q channel is zero thus closing the carrier loop. During the rest of the multiplexing time, the correlators are in "weighted mode" and reduce the multipath effect on the carrier signal.

FIG. 11B illustrates the augmented architecture for obtaining weighted Punctual Inphase and Punctual Quadrature correlator sums that is similar to the architecture of FIG. 11A. The difference is that in the device of FIG. 11B two correlators (I and Q) are used for each set of standard (452 and 454) and weighted (456 and 458) correlators.

In another preferred embodiment, the weighted correlators utilize the two-clock width of the master clock as the implementation of the weighting function F(t) as shown in FIGS. 12A and 12B. (See also FIG. 8B). In one embodiment, this can be done (FIG. 12A) by using an extra flip-flop 466 and an "OR" Gate 468.

Yet, in one More preferred embodiment (FIGS. 13A and B) the weighted region width is extended to an arbitrary number of master clock periods, using the Set and Reset functions of a flip-flop 496 along with a re-loadable counter 498 having Enable and Terminal Count capabilities.

Yet, in another preferred embodiment (FIGS. 14A and B), a completely arbitrary weighting function is implemented. The device of FIGS. 14A and 14B can be viewed as an implementation of a dynamic weighting function Θ(t) depicted in FIG. 6E. A lookup table 542 is fed by the J bits (544) of the Code NCO generator (541), or the L most significant bits (MSB) of the code NCO generator. As each sample takes place, the Code NCO output defines exactly where in the one chip period the current sample lies. The output of this lookup table (543) is a K bit value which allows a weighting value resolution of 2**K distinct values. The samples 550 which feed the standard uniformly weighted Punctual I and Q correlators 556 are then multiplied in a multiplier 548 by the lookup table value, before being accumulated into the non-uniformly weighted Punctual I and Q correlators.

In the most general case wherein different weights are assigned to the non-uniformly weighted Punctual I and Q correlators, two lookup tables can be used. Both lookup table inputs are fed by the code NCO generator, but the outputs are fed to the associated multiplier and the assigned I or Q weighted correlator. Some form of the delay means can be employed in the I or Q weighted correlator paths to compensate for the code shift. The delay means can be implemented by using a separate code NCO operating with the delay offset already incorporated into its code generator. In another embodiment, the delay can be implemented by using a set of discrete flip-flops either at the lookup table input (J or L bits) or at the lookup table output (K bits).

The effective weighting function can be implemented by employing a two channel device depicted in FIGS. 15A and 15B using the readily available digital signal processor (DSP) chips. The device of FIG. 15A comprises a channel A (620,1), a channel B (620, 2), and a computer (631). This device implements a single non-zero left side weighting region of arbitrary width from uniformly weighted correlators.

In both A and B channels the carrier NCOs are run identically. The channel A is tracking both the code and the carrier signals as normal. In one embodiment, the channel B's code NCO has a positive offset as compared with the channel A's code NCO. In this embodiment, the channel B is delayed as compared with channel A (see FIGS. 9A and 9C). In another embodiment, the channel B's code NCO has a negative offset, that is, the channel B is advanced as compared with the channel A (see FIGS. 9A and 9B).

To achieve the left side weighting functions we isolate and obtain the correlation function only for Region Z (FIGS. 9B, 9C).

For the advanced embodiment shown in FIGS. 9A and 9B:

Region Z=½* (Puncnt_B+Punct_A).

For the delayed embodiment depicted in FIGS. 9A and 9C:

Region Z=½* (Punct_A−Punct_B).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for use in decoding a composite signal (CS) that includes a distortion component, said apparatus comprising:

a first generating means for generating a reference signal;

a second generating means for generating a time varying weighting signal which, when mixed with said composite signal and said reference signal, suppresses said distortion component; and a mixing means for mixing said reference signal, said time varying weighting signal, and said composite signal to produce a first correlation resulting signal that represents a timing relationship between said composite signal and said reference signal without shifting a tracking point in said second generating means.

2. The apparatus of claim 1;

wherein said composite signal (CS) includes a transmitted direct signal (DS); and wherein said distortion component includes at least one multipath noise signal (MS); and wherein said first generating means for generating a reference signal further comprises:

a conversion means for down-converting said received composite signal CS into two orthogonally-related signals, said first orthogonally-related signal being an inphase composite signal ICS, said second orthogonally-related signal being a quadrature composite signal QCS; and wherein said second generating means for generating a time varying weighting signal further comprises:

a first weighting function generator means connected to said conversion means for providing a first weighting timing function (F1(t)); and a second weighting function generator means connected to said conversion means for providing a second weighting timing function (F2(t)); and wherein said mixing means further comprises:

a first correlator means connected to said first weighting function generator, wherein a correlation waveform is formed by said first correlator means as a correlation signal between a reference signal and said received composite signal CS, and wherein said waveform is related to the relative strength of said orthogonally converted ICS and QCS signals, and wherein said first weighting function F1(t) is utilized for determining a first time point t1 within a clock time period τ corresponding to a first point CS1 of said waveform, and wherein at said first time point t1 the tracking of said composite signal CS is completed, and wherein said first correlator means outputs said first composite signal CS1 including a first multipath signal MP1 corresponding to said first time point t1;

a second correlator means connected to said second weighting function generator means, wherein said second weighting function F2(t) is utilized for determining a second time point t2 corresponding to a second point CS2 on said waveform, wherein said second correlator means outputs said second composite signal CS2 including a second multipath signal MP2 corresponding to said second time point t2, and wherein said multipath signal MS2 at said second time point t2 is reduced as compared with said multipath signal MP1 at said first time point t1;
and a computer means connected to said first correlator means and connected to said second correlator means for controlling said first correlator means and for controlling said second correlator means.

3. The apparatus of claim 2, wherein said second weighting function F2(t) is utilized for selecting said second time point t2 corresponding to said second point CS2 on said waveform to be earlier than said first time point t1 selected by using said first weighting function F1(t).

4. The apparatus of claim 2, wherein said second weighting function F2(t) is utilized for selecting said second time point t2 corresponding to said second point CS2 on said waveform to be later than said first time point t1 selected by using said first weighting function F1(t).

5. The apparatus of claim 2, wherein said weighting function F2(t) is utilized for selecting said second time point t2 corresponding to said second point CS2 on said waveform to be at the same time point as said first time point t1 selected by using said first weighting function F1(t).

6. The apparatus of claim 2 further including a clock timing generator means connected to said conversion means for providing the timing clock signal having the time period τ.

7. The apparatus of claim 6, wherein said clock timing generator means further includes a code numerically control oscillator (NCO) means for providing a code clock with period one code chip, and wherein said timing clock period τ is equal to two code chips.

8. The apparatus of claim 2, wherein said conversion means further includes a carrier NCO generator means for providing a carrier timing clock signal.

9. The apparatus of claim 2, wherein said second weighting function generator further includes a one-clock width weighting function generator, and wherein said one-clock weighting function generator is applied to the beginning of said code chip.

10. The apparatus of claim 9, wherein said one-clock width weighting generator further includes a set of two flip-flops for providing a set of enabling signals for controlling the timing of the output signal generated by said second correlator means.

11. The apparatus of claim 2, wherein said second weighting function generator further includes a two-clock width weighting generator, and wherein said two-clock weighting function generator is applied to the beginning of said code chip.

12. The apparatus of claim 11, wherein said two-clock width weighting generator further includes a set of three flip-flops and an "OR" gate for providing a set of enabling signals for controlling the timing of the output signal generated by said second correlator means.

13. The apparatus of claim 2, wherein said second weighting function generator further includes an N clock width weighting generator, N being an integer, and wherein said N clock weighting function generator is applied to the beginning of said code chip.

14. The apparatus of claim 13, wherein said N clock width weighting generator further includes a set of three flip-flops and a counter for providing a set of enabling signals for controlling the timing of the output signal generated by said second correlator means.

15. The apparatus of claim 2, wherein said second weighting function generator further includes an arbitrary weighting generator.

16. The apparatus of claim 15, wherein said arbitrary weighting generator further includes a lookup table means for providing a set of enabling signals for controlling the timing of the output signal generated by said second correlator means.

17. The apparatus of claim 2, wherein said first correlator means further includes an I (inphase) channel first correlator means and a Q (quadrature) channel first correlator means, and wherein said second correlator means further includes an I channel second correlator means and a Q channel second correlator means, and wherein said composite signal in said first Q channel is equal to zero after the carrier tracking loop is closed, and wherein said I channel second correlator means and Q channel second correlator means are used for making an estimate of said carrier multipath signals.

18. An apparatus for carrier phase multipath noise reduction of a received composite signal (CS) that includes a transmitted direct signal (DS) and at least one mutipath noise signal (MS), said apparatus comprising:

a channel A means further comprising:

a conversion means for converting said received composite signal into two orthogonally-related signals, said first signal being an inphase composite signal, said second signal being a quadrature composite signal;

a clock timing generator means connected to said conversion means for providing the timing clock signal having the time period τ;

a punctual inphase (I) correlator means connected to the I channel of said conversion means for determining punctual amplitude of a waveform formed as a correlation signal between a reference signal and said received inphase composite signal, wherein said punctual inphase correlator means outputs a punctual inphase composite signal; and a punctual quadrature (Q) correlator means connected to the Q channel of said conversion means for assisting in closing of the tracking carrier loop, wherein when said carrier tracking loop is closed the quadrature composite signal is equal to zero;

a channel B means further comprising:

a conversion means for converting said received composite signal into two orthogonally-related signals, said first signal being an inphase composite signal; said second signal being a quadrature composite signal;

a clock timing generator means connected to said conversion means for providing the shifted-in-time timing clock signal having the time period τ as compared with said channel A timing clock signal;

a punctual inphase (I) and a quadrature (Q) correlator means connected to the I channel of said conversion means for determining delayed amplitude of a waveform in said I and Q channels formed as a correlation signal between a reference signal and said received inphase composite signal, wherein said punctual inphase correlator means outputs shifted-in-time inphase and quadrature composite signals as compared with said channel A inphase and quadrature composite output signals, and wherein said I and Q channel are used for estimation of said carrier multipath signals; and a computer means connected to said A channel means and connected to said B channel means for performing the control function of said A channel means and said B channel means.

19. The apparatus of claim 18, wherein said channel B punctual inphase correlator means outputs a delayed inphase composite signal as compared with said channel A punctual inphase correlator means output signal.

20. The apparatus of claim 18, wherein said channel B punctual inphase correlator means outputs an advanced inphase composite signal as compared with said channel A punctual inphase correlator means output signal.

21. The apparatus of claim 18, wherein said channel B punctual inphase correlator means outputs an inphase composite signal that has a zero delay as compared with said channel A punctual inphase correlator means output signal.

22. An apparatus for carrier phase multipath noise reduction of a received composite signal (CS) that includes a transmitted direct signal (DS) and at least one multipath noise signal (MS), said apparatus utilizing a dynamic weighting function generator for reducing the multipath noise, said apparatus comprising:

a conversion means for down-converting said received composite signal CS into two orthogonally-related signals, said first orthogonally-related signal being an inphase composite signal ICS, said second orthogonally-related signal being a quadrature composite signal QCS;

a first dynamic weighting function generator means connected to said conversion means for providing a first dynamic weighting timing function ($\Theta 1(t)$), wherein said first dynamic function $\Theta 1(t)$ changes over time;

a second dynamic weighting function generator means connected to said conversion means for providing a second dynamic weighting timing function ($\Theta 2(t)$), wherein said second dynamic function $\Theta 2(t)$ changes over time;

a first correlator means connected to said first weighting function generator, wherein a correlation waveform is formed by said first correlator means as a correlation signal between a reference signal and said received composite signal CS, and wherein said waveform is related to the relative strength of said orthogonally converted ICS and QCS signals, and wherein said first dynamic weighting function $\Theta 1(t)$ is utilized for determining a first time point t1 within a clock time period $\tau$ corresponding to a first point CS1 of said waveform, and wherein at said first time point t1 the tracking of said composite signal CS is completed, and wherein said first correlator means outputs said first composite signal CS1 including a first multipath signal MP1 corresponding to said first time point t1;

a second correlator means connected to said second dynamic weighting function generator means, wherein said second dynamic weighting function $\Theta 2(t)$ is utilized for determining a second time point t2 corresponding to a second point CS2 on said waveform, wherein said second correlator means outputs said second composite signal CS2 including a second multipath signal MP2 corresponding to said second time point t2, and wherein said multipath signal MS2 at said second time point t2 is reduced as compared with said multipath signal MP1 at said first time point t1;

and a computer means connected to said first correlator means and connected to said second correlator means for controlling said first correlator means and for controlling said second correlator means.

23. An apparatus for carrier phase multipath noise reduction of a received composite signal (CS) that includes a transmitted direct signal (DS) and at least one multipath noise signal (MS), said apparatus utilizing a weighted timing function generator for reducing the multipath noise, said apparatus comprising:

a conversion means for down-converting said received composite signal CS into two orthogonally-related signals, said first orthogonally-related signal being an inphase composite signal ICS, said second orthogonally-related signal being a quadrature composite signal QCS;

a weighting function generator means connected to said conversion means for providing a weighting timing function (F(t));

a weighted Punctual and Quadrature correlator means connected to said weighting function generator, wherein said weighting function F(t) is utilized for determining a first time point t1 within a clock time period $\tau$ corresponding to a first point CS1 of said waveform, and wherein at said first time point t1 the tracking of said composite signal CS is completed, and wherein said multipath signal MS1 at said first point CS1 is reduced as compared with the situation when said weighting function F(t) is not employed;

and a computer means connected to said correlator means and connected to said weighted correlator means for controlling said weighted correlator means.

24. A method for use in decoding a composite signal having a distortion component, said method comprising the steps of:

generating a reference signal;

generating a time varying weighting signal which, when mixed with said composite signal and said reference signal, suppresses said distortion component; and mixing said reference signal, said weighting signal, and said composite signal to produce a first correlation resulting signal that represents a timing relationship between said composite signal and said reference signal without shifting a tracking point in a second generating means.

25. A method for carrier phase multipath noise reduction of a received composite signal (CS) that includes a transmitted direct signal (DS) and at least one multipath noise signal (MS), said method employing an apparatus utilizing a weighting function generator for reducing the multipath noise, said method comprising the steps of:

converting said received composite signal CS into two orthogonally-related signals using a conversion means, said first orthogonally-related signal being an inphase composite signal ICS, said second orthogonally-related signal being a quadrature composite signal QCS;

determining a first time point t1 within a clock time period $\tau$ corresponding to a first point CS1 of a waveform by employing a first correlator means, wherein said waveform is formed as a correlation signal between a reference signal and said received composite signal CS, wherein said waveform is related to the relative strength of said orthogonally converted ICS and QCS signals;

providing a weighting timing function (F(t)) by using a weighting function generator means;

determining a second time point t2 corresponding to a second point CS2 on said waveform by using a second correlator means, wherein said second correlator means utilizes said weighting function F(t), and wherein said multipath signal MS2 at said second time point t2 is reduced as compared with said multipath signal MP1 at said first time point t1; and performing the control function of said first correlator means and said second correlator means by using a computer means.

* * * * *